(12) United States Patent
Ryu et al.

(10) Patent No.: US 10,929,523 B2
(45) Date of Patent: Feb. 23, 2021

(54) ELECTRONIC DEVICE AND METHOD FOR MANAGING DATA IN ELECTRONIC DEVICE

(71) Applicant: Samsung Electronics Co., Ltd., Suwon-si (KR)

(72) Inventors: Jae-Min Ryu, Suwon-si (KR); Sung-Bae Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 15/879,062

(22) Filed: Jan. 24, 2018

(65) Prior Publication Data
US 2018/0211029 A1     Jul. 26, 2018

(30) Foreign Application Priority Data

Jan. 25, 2017   (KR) .................. 10-2017-0012255

(51) Int. Cl.
| | | |
|---|---|---|
| *G06F 21/62* | (2013.01) | |
| *G06F 21/44* | (2013.01) | |
| *G06F 21/53* | (2013.01) | |

(52) U.S. Cl.
CPC .............. *G06F 21/44* (2013.01); *G06F 21/53* (2013.01); *G06F 21/6218* (2013.01); *G06F 2221/033* (2013.01); *G06F 2221/2111* (2013.01)

(58) Field of Classification Search
None
See application file for complete search history.

(56) References Cited

U.S. PATENT DOCUMENTS

| | | | |
|---|---|---|---|
| 8,904,552 B2* | 12/2014 | Mo ...................... | G06F 21/57 711/164 |
| 9,635,048 B2* | 4/2017 | Litva ..................... | G06F 21/554 |
| 10,404,708 B2* | 9/2019 | Capone ................. | G06F 16/176 |
| 2004/0091114 A1* | 5/2004 | Carter .................. | G06F 21/606 380/259 |
| 2004/0165724 A1 | 8/2004 | Choi et al. | |
| 2004/0250113 A1* | 12/2004 | Beck ..................... | H04L 63/12 726/27 |

(Continued)

FOREIGN PATENT DOCUMENTS

| | | |
|---|---|---|
| EP | 2437199 A2 | 4/2012 |
| KR | 10-0819382 B1 | 4/2008 |

(Continued)

OTHER PUBLICATIONS

Extended European Search Report dated Oct. 18, 2019, issued in European Patent Application No. 18745235.4-1213.

*Primary Examiner* — Kambiz Zand
*Assistant Examiner* — Arezoo Sherkat
(74) *Attorney, Agent, or Firm* — Jefferson IP Law, LLP

(57) ABSTRACT

An electronic device is provided. The electronic device includes a memory and at least one processor configured to execute a first application among at least one application stored in the memory, determine whether to permit to provide meta information including information for accessing first data related to a first function of the first application stored in the memory based on first user information with which the first application is executed, and perform control as to whether to provide a virtual file system with the meta information about the first data.

18 Claims, 12 Drawing Sheets

(56) References Cited

U.S. PATENT DOCUMENTS

| | | | |
|---|---|---|---|
| 2005/0131955 A1* | 6/2005 | Borthakur | G06F 16/148 |
| 2006/0004699 A1 | 1/2006 | Lehikoinen et al. | |
| 2007/0174910 A1* | 7/2007 | Zachman | G06F 21/53 |
| | | | 726/18 |
| 2008/0162948 A1 | 7/2008 | Choi et al. | |
| 2008/0228770 A1* | 9/2008 | Halcrow | G06F 16/119 |
| 2011/0085667 A1 | 4/2011 | Berrios et al. | |
| 2011/0213971 A1* | 9/2011 | Gurel | G06F 21/10 |
| | | | 713/165 |
| 2013/0219176 A1* | 8/2013 | Akella | H04L 63/0815 |
| | | | 713/165 |
| 2014/0149461 A1* | 5/2014 | Wijayaratne | H04L 63/101 |
| | | | 707/785 |
| 2014/0258155 A1 | 9/2014 | Suryanarayanan et al. | |
| 2014/0259190 A1 | 9/2014 | Kiang et al. | |
| 2014/0281501 A1* | 9/2014 | Korkishko | H04L 63/123 |
| | | | 713/156 |
| 2014/0331279 A1* | 11/2014 | Aissi | G06F 21/53 |
| | | | 726/1 |
| 2015/0286345 A1 | 10/2015 | Garcia-Sanchez | |
| 2016/0085981 A1 | 3/2016 | Bruwer et al. | |
| 2016/0267261 A1 | 9/2016 | Tooley | |
| 2016/0314082 A1* | 10/2016 | Korkishko | H04L 63/123 |
| 2016/0321291 A1* | 11/2016 | Malhotra | G06F 16/188 |
| 2016/0359859 A1* | 12/2016 | Capone | G06F 21/6218 |
| 2018/0082057 A1* | 3/2018 | LeMay | G06F 21/54 |
| 2019/0278908 A1* | 9/2019 | Mehta | G06F 21/54 |

FOREIGN PATENT DOCUMENTS

| | | | |
|---|---|---|---|
| KR | 10-2015-0128941 A | 11/2015 | |
| KR | 10-1590626 B1 | 2/2016 | |
| WO | 2014/116748 A1 | 7/2014 | |

\* cited by examiner

ELECTRONIC DEVICE AND METHOD FOR MANAGING DATA IN ELECTRONIC DEVICE

CROSS-REFERENCE TO RELATED APPLICATION(S)

This application claims the benefit under 35 U.S.C. § 119(a) of a Korean patent application filed on Jan. 25, 2017 in the Korean Intellectual Property Office and assigned Serial number 10-2017-0012255, the entire disclosure of which is hereby incorporated by reference.

TECHNICAL FIELD

The present disclosure relates to data management methods. More particularly, the present disclosure relates to electronic devices capable of protecting data stored in the memory from malicious applications or processes and methods for managing data in the electronic devices.

BACKGROUND

There are being developed various types of smart devices based on operating systems (OSs) according to the related art. Some examples of such may include smartphones, smart televisions (TVs), smart watches, bands, Google Glass, virtual reality (VR) devices, or other various wearable devices. The growth of technology is leading such smart devices to provide various types of functions including, e.g., alarm, short message service (SMS), email, game, short-range communication remote control, image capturing using an equipped digital camera, multimedia functions for providing audio and video content, scheduling, and other similar functions.

Such smart devices of the related art may provide the above-listed functions or may execute applications capable of providing at least one of other functions or operations on the smart devices. Example of such applications may include at least one of music play applications, video play applications, photo gallery applications, game applications, social media applications, Internet browsing applications, file manager applications, cloud service applications, and any other similar or proper applications, functions, or operations.

Such smart devices of the related art may adopt access control for controlling inter-system resource access with processes of executing the applications to protect data related to the processes or the applications. The access control is the technology in which a policy between the resource (e.g., an object) and the entity (e.g., a subject) of the process or application to access is previously defined and registered, and the access of the application or process to the resource is controlled (e.g., allowed or denied) as per the policy, and this technology is a core security technique that serves as a basis for most of platforms, e.g., Android or iOS.

There are recently more attempts to raise system security using the container technology along with the above-described access control. System security may be reinforced by isolating personal area from business area using the container technology and blocking the two execution environments from each other.

Upon applying the above-described access control technique to protect sensitive, confidential data for security against malicious applications or processes, such protection is achieved through the access control technology with, e.g., the presence or absence of the sensitive, confidential data for security, which is statically left in the file system, such as file or directory, and location information disclosed. This imposes the limitation that each piece of sensitive, confidential data for security cannot be concealed. Further, when the system components have bugs or the access control policy is wrong, all the data may be stolen through device rooting in the rootkit, and the system cannot be protected.

Where the container technology is applied to protect the sensitive, confidential data for security, it can be controlled whether to provide meta information for each directory to the virtual file system (e.g., whether the virtual file system has visibility on the directory) per container, but not whether to provide the meta information for each piece of data in the directory to the virtual file system (e.g., whether the virtual file system has visibility on the data). Thus, where sensitive, confidential data for security and non-confidential data are mixed in the directory, the pieces of data should be separated for each case, as many directories as the number of cases should be reconfigured and stored in the memory. This results in waste of storage.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for managing data in the electronic device, which may protect data without making changes in configuration to the memory of the electronic device by performing control as to whether to provide the virtual file system with meta data for each piece of data stored in the memory (e.g., whether the virtual file system has visibility for the data).

In accordance with an aspect of the present disclosure, an electronic device is provided. The electronic device includes a memory and a processor configured to execute a first application among at least one application stored in the memory, determine whether to permit to provide meta information including information for accessing first data related to a first function of the first application stored in the memory based on first user information with which the first application is executed, and perform control as to whether to provide a virtual file system with the meta information for the first data.

In accordance with another aspect of the present disclosure, a method for managing data in an electronic device is provided. The method includes executing a first application among at least one application stored in a memory of the electronic device, determining whether to permit to provide meta information including information for accessing first data related to a first function of the first application stored in the memory based on first user information with which the first application is executed among pieces of user information stored in the memory, and performing control as to whether to provide a virtual file system with the meta information for the first data as a result of the determination.

In accordance with another aspect of the present disclosure, a computer readable recording medium recording a program running on a computer is provided. The program includes executable commands executed by a processor to enable the processor to execute a first application among at least one application stored in a memory of the electronic device, determine whether to permit to provide meta information including information for accessing first data related to a first function of the first application stored in the memory based on first user information with which the first application is executed among pieces of user information stored in the memory, and perform control as to whether to provide a virtual file system with the meta information for the first data as a result of the determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in connection with the accompanying drawings, in which.

Throughout the drawings, like reference numerals will be understood to refer to like parts, components, and structures.

DETAILED DESCRIPTION

Figure 1:
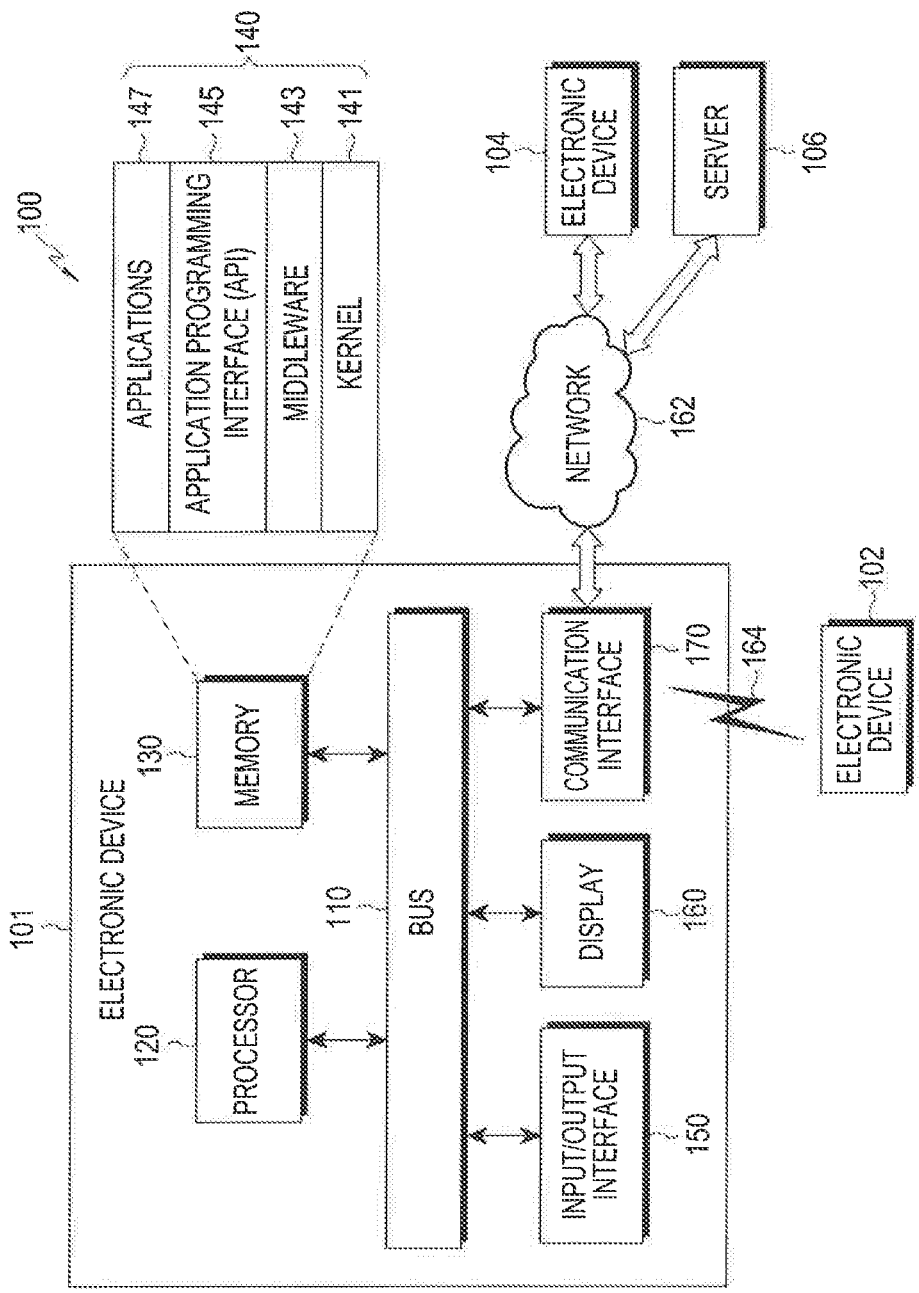
FIG. 1 is a view illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments of the present disclosure, examples of the smart home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to various embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

FIG. 1 is a view illustrating an electronic device in a network environment according to an embodiment of the present disclosure.

Referring to FIG. 1, according to an embodiment of the present disclosure, an electronic device 100 is included in a network environment. The electronic device 101 may include a bus 110, a processor 120, a memory 130, an input/output interface 150, a display 160, and a communication interface 170. In some embodiments of the present disclosure, the electronic device 101 may exclude at least one of the components or may add another component. The bus 110 may include a circuit for connecting the components 120 to 170 with one another and transferring communications (e.g., control messages or data) between the components. The processor 120 may include one or more of a CPU, an AP, or a communication processor (CP). The processor 120 may perform control on at least one of the other components of the electronic device 101 or perform an operation or data processing relating to communication.

The memory 130 may include a volatile and/or non-volatile memory. For example, the memory 130 may store commands or data related to at least one other component of, e.g., the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application 147 in order of priority. For example, the middleware 143 may assign a priority of using system resources (e.g., bus 110, processor 120, or memory 130) of the electronic device 101 to at least one of the applications 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, and/or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106).

The wireless communication may include cellular communication which uses at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM). According to an embodiment of the present disclosure, the wireless communication may include at least one of, e.g., wireless-fidelity (Wi-Fi), light-fidelity (Li-Fi), Bluetooth (BT), Bluetooth low power (BLE), zigbee, near-field communication (NFC), magnetic secure transmission (MST), radio frequency (RF), or body area network (BAN) as denoted with element 164 of FIG. 1. According to an embodiment of the present disclosure, the wireless communication may include GNSS. The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
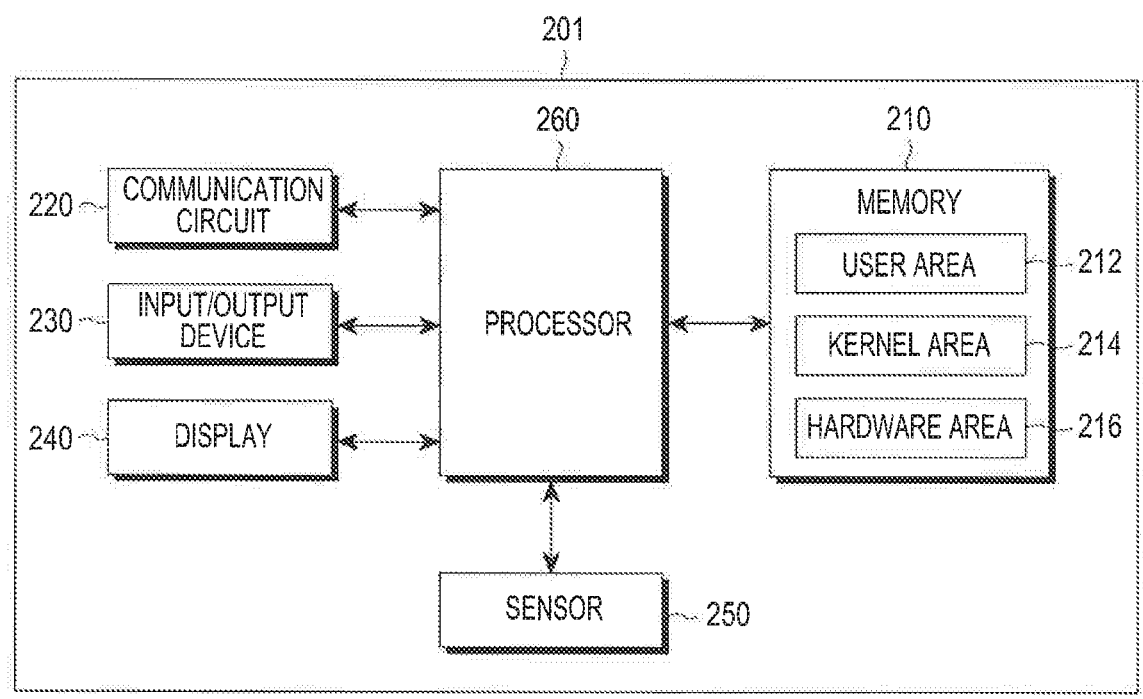
FIG. 2 is a block diagram illustrating an electronic device according to an embodiment of the present disclosure.

FIG. 2 is a block diagram illustrating an electronic device according to an embodiment of the present disclosure.

Referring to FIG. 2, according to an embodiment of the present disclosure, an electronic device 201 may include at least one of a memory 210, a communication circuit 220, an input/output device 230, a display 240, a sensor 250, or a processor 260. The electronic device 201 may include the whole or part of the electronic device 101 shown in FIG. 1.

The memory 210 (e.g., the memory 130 of FIG. 1) may temporarily store a program necessary for functional operations of at least one application installed on the electronic device 201 and various types of data generated while the program is running. The memory 210 may largely include a program area and a data area. The program area may store relevant information for driving the electronic device 201, such as OS for booting up the electronic device 201. The data area may store data communicated and generated according to an embodiment of the present disclosure.

The memory 210 may include at least one of a user area, a kernel area 214, or a hardware area 216. According to an embodiment of the present disclosure, the memory 210 may contain and store at least one application (or a program or container) in an independent storage area (e.g., a user area 212). According to an embodiment of the present disclosure, the memory 210 may include at least one of a system resource manager or a device driver in the kernel area 214.

According to an embodiment of the present disclosure, the memory 210 may include the hardware area 216, as a physical area, which actually stores data (e.g., files) related to the function of at least one application (or a program or container) installed on the electronic device 201 or a system object, such as at least one folder or directory including the data. For example, the hardware area 216 of the memory 210 may include at least one storage medium of a flash memory, a hard disk, a multimedia card, a micro-type memory (e.g., a secure digital (SD) or an extreme digital (xD) memory), a random access memory (RAM), or a read only memory (ROM).

The kernel area of the memory 210 may include a native file system and a virtual file system.

The native file system may include native data (e.g., files) stored in the physical storage medium positioned in the hardware area 216 and a folder or directory including the data. When invoked through a system call as per the operation of at least one function of the application (or a program or container) executed, the processor 260 may invoke the data related to at least one function of the executed application or a folder or directory including the data into the native file system. The processor 260 may determine whether to provide the virtual file system in the kernel area 214 with meta information (e.g., inode) including information for accessing the data or the folder or directory including the data which has been invoked into the native file system as per security settings for the data or the data-containing folder or directory in the native file system.

The memory 210 may also store the at least one application installed on the electronic device 201, data related to at least one function of each of the at least one application, the meta information (e.g., inode) including information for accessing the data, and user-related information.

According to an embodiment of the present disclosure, the meta information may include at least of, e.g., data name (e.g., file name), data type (e.g., file extension), access privilege (e.g., read, write, or run), ownership information (e.g., owner, owner group, or other (third party) user), data size (e.g., file size), time varied, time accessed, data position (e.g., file, folder, or directory position), data attribute information (e.g., xattr), identification information (e.g., inode number or i-number), or a combination thereof. The data attribute information (xattr) may include a security context for the data.

Table 1 below represents a 16-bit flag storing the execution privilege among the pieces of meta information as an example of the meta information (e.g., inode) including the information for accessing each piece of data (e.g., file, folder, or directory).

TABLE 1

| Bit | Details |
| --- | --- |
| 12-15 | file type (normal, directory, character, or block) |
| 9-11 | execution flag |
| 8 | permit owner to read |
| 7 | permit owner to write |
| 6 | permit owner to execute |
| 5 | permit owner group to read |
| 4 | permit owner group to write |
| 3 | permit owner group to execute |
| 2 | permit other (third party) user to read |
| 1 | permit other (third party) user to write |
| 0 | permit other (third party) user to execute |

According to an embodiment of the present disclosure, the user-related information may include, e.g., information about the user registered in at least one application installed on the electronic device 201. The user information may be the user account for the application. The user account may include, e.g., user identity (ID), user group ID, user password, user group password, or identification information (e.g., inode number or i-number) assigned corresponding to each of user ID, user group ID, user password, or user group password.

The structure of the memory 210 is described below with reference to FIG. 3.

The communication circuit 220 (e.g., the communication interface 170 of FIG. 1) of the electronic device may perform communication with other electronic device or external electronic device (e.g., the electronic device 102 or 104 of FIG. 1) under the control of the processor 260. According to an embodiment of the present disclosure, the communication circuit 220 may communicate data related to an operation run under the control of the processor 260 with an external device.

The communication circuit 220 may connect to a network through wireless communication or wired communication via the communication interface or perform communication through inter-device connection. The wireless connection may be made by various radio communication protocols, including, but not limited to, Wi-Fi, BT, zigbee, z-wave, NFC, GPS, or cellular communication protocols (e.g., LTE, LTE-advanced (LTE-A), CDMA, WCDMA, UMTS, WiBro or GSM. The wired communication may include at least one of, e.g., USB, HDMI, RS-232, POTS, universal asynchronous receiver transmitter (UART), inter-integrated circuit (I2C), serial peripheral interface (SPI), or controller area network (CAN). The communication circuit 220 may include all other types of communication schemes that have been widely known or are to be developed in the future, in addition to the above-enumerated communication schemes.

According to an embodiment of the present disclosure, the input/output device 230 (e.g., the input/output interface 150 of FIG. 1) of the electronic device may transfer, to the processor 260, various information, such as number and character information entered from the user and signals input or output in relation with setting various functions and controlling functions by the electronic device. The input/output device 230 may support a user input/output for running an application or module supporting a particular function. The input/output device 230 may include at least one of a key input means, such as a keyboard or keypad, a touch input means, such as a touch sensor or touchpad, a sound source input means, a camera, or various sensors, and the input/output device 230 may include a gesture input means. Further, the input/output device 230 may include all types of input/output means that are being currently in development or are to be developed in the future. According to an embodiment of the present disclosure, the input/output device 230 may receive or output, from the user, information entered by the user through the touch panel of the display 240 or the camera and may transfer the received or output information to the processor 260.

The input/output device 230 may transfer, to the processor 260, information related to the user's gesture received through the camera or various sensors. The input/output device 230 may transfer, to the processor 260, an input/output signal according to the selection of at least one object (e.g., a content) displayed on the screen.

The input/output device 230 may further include an audio module (not shown) (e.g., the input/output interface 150 of FIG. 1). The audio module may output sounds and may include at least one of, e.g., an audio codec, a microphone (MIC), a receiver, an earphone output (EAR_L) or a speaker.

According to an embodiment of the present disclosure, the display 240 (e.g., a partial configuration of the input/output interface 150 or display 160 of FIG. 1) of the electronic device may output information on a result of running an operation (e.g., at least one of text, image, or video) under the control of the processor 260.

The display 240 may display, on the screen, an input pad (e.g., a button) for entering at least one of various numbers, characters, or symbols on an input window, in various manners. The display 240 may display a screen of running a service according to the execution of various applications related to information communication. According to an embodiment of the present disclosure, the display 240, when implemented in the form of a touchscreen, may correspond to the touchscreen of a predetermined input device (not shown). The display 240, when implemented together with the input/output device 230 in the form of a touchscreen, may display various information generated according to the user's touch operation.

According to an embodiment of the present disclosure, the display 240 of the electronic device may include at least one of a LCD, a thin film transistor LCD (TFT-LCD), an OLED display, a LED display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent OLED (TOLED) display.

The electronic device 201 may further include, in addition to the display 240, another display device (e.g., an expanded display device or flexible display device) or a display device of an external electronic device (e.g., at least one of an external electronic device, a wearable device, or an external terminal device) interworking with the electronic device 201.

The sensor 250 may detect context information related to the electronic device 201. The sensor 250 may measure a physical quantity or detect an operational stage of the electronic device 201, and the sensor module 1040 may convert the measured or detected information into an electrical signal. The sensor 250 may include at least one of, e.g., a gesture sensor, a gyro sensor, an atmospheric pressure sensor, a magnetic sensor, an acceleration sensor, a grip sensor, a proximity sensor, a color sensor, such as a red-green-blue (RGB) sensor, a bio sensor, a temperature/humidity sensor, an illumination sensor, or an ultraviolet (UV) sensor. Additionally or alternatively, the sensor 250 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor 250 may include a location-based sensor (e.g., a GPS sensor) capable of detecting location information about the electronic device 201. The sensor 250 may further include a control circuit for controlling at least one or more of the sensors included in the sensing module. According to an embodiment of the present disclosure, the electronic device 201 may further include a processor configured to control the sensor 250 as part of the processor 260 or separately from the processor 260, and the electronic device 201 may control the sensor 250 while the processor 260 is in a sleep mode.

The processor 260 (e.g., the processor 120 of FIG. 1) may overall control the electronic device 201. According to an embodiment of the present disclosure, the processor 260, which may be a hardware module or software module (e.g., an application program), may be a hardware component (function) or software component (program) including at least one of various sensors, data measuring module, input/output interface, a module for managing the state or environment of the electronic device 201, or communication module as included in the electronic device 201. According to an embodiment of the present disclosure, the processor 260 may include one of, e.g., hardware, software, or firmware, or a combination of two or more thereof. According to an embodiment of the present disclosure, the processor 260 may lack at least some of the components or may include other components for performing an image processing operation in addition to the components.

According to an embodiment of the present disclosure, when implemented in hardware, the configuration of at least a portion of the processor 260 of the electronic device may include some of at least one processor including a CPU/ micro processing unit (MPU), a memory (e.g., a register and/or RAM) where at least one piece of memory loading data is loaded, and a bus for inputting/outputting at least one piece of data to/from the processor 260 and memory 210. When implemented in software, the processor 260 may include a predetermined program routine or program data that is loaded from a predetermined recording medium to a memory 210 to perform a defined function on the electronic device 201 and is processed by the processor 260.

The processor 260 may process information according to an operation of the electronic device or information according to execution of a program, an application, or a function, and the processor 260 may perform control to display the processed information on the display 240 or output the processed information through an audio module (not shown).

The processor 260 may perform control to display various types of data (e.g., file, folder, or directory) on the whole or part of the screen of the display 240.

The processor 260 may execute a first application among at least one application stored in the electronic device 201.

The processor 260 may log into the first application using a user account registered in the first application. The processor 260 may allocate corresponding to the information about the user who logs in upon login using the user information registered in the first application. For example, the user information registered in the first application may include the user account. Upon login through the user information, the processor 260 may allocate identification information corresponding to the user information.

According to an embodiment of the present disclosure, the user information registered in the first application may include first user information. The first user information may be a first user account for the first application. The first user account may include, e.g., a first ID, a first user group ID, a first user password, a first user group password, or first identification information (e.g., inode number or i-number) assigned corresponding to each of the first user ID, the first user group ID, the first user password, or the first user group password.

The processor 260 may generate a credential corresponding to the first user information based on the first user information. The credential may mean a certificate for proving the privilege to access data related to at least one function of at least one application (or program) allocated corresponding to the user information when the user logs in.

The processor 260 may perform at least one function of the first application corresponding to the first user information based on the generated credential.

According to an embodiment of the present disclosure, the processor 260 may execute the first application based on first data related to a first function of the first application among the at least one application stored in the memory 210 of the electronic device 201.

The processor 260 may determine whether to permit to provide meta information including information for accessing the first data related to the first function of the first application stored in the memory 210 based on the first user information with which the first application has been executed among the pieces of user information stored in the memory 210 of the electronic device 201. For example, the processor 260 may identify the operation of the first function of the first application related to the first data stored in the memory 210 of the electronic device 201.

According to an embodiment of the present disclosure, the operation of the first function of the first application may include the operation of reading, writing, or executing the first data from the folder or directory storing the first data in the memory 210. In response to the identification of the operation of the first function of the first application, the electronic device 201 may determine whether to permit to provide the meta information including the information for accessing the first data based on the first user information with which the first application has been executed.

The processor 260 may perform control as to whether to provide the meta information for the first data to the virtual file system based on the results of the determination.

According to an embodiment of the present disclosure, upon determining that it is permitted to provide the meta information for the first data, the processor 260 may provide the virtual file system with the meta information for the first data loaded onto the native file system in the memory 210 as per the operation of the first function of the first application.

According to an embodiment of the present disclosure, upon determining that it is permitted to provide the meta information for the first data, the processor 260 may provide the virtual file system with the meta information for the first data loaded onto the native file system in the memory 210 as per the operation of the first function of the first application, together with the meta information including information for accessing at least one piece of second data in the folder or directory including the first data, loaded together onto the native file system in the memory 210 as per the operation of the first function of the first application.

According to an embodiment of the present disclosure, upon determining that it is not permitted to provide the meta information for the first data, the processor 260 may block providing the virtual file system with the meta information for the first data loaded onto the native file system in the memory 210 as per the operation of the first function of the first application.

According to an embodiment of the present disclosure, upon determining that it is not permitted to provide the meta information for the first data, the processor 260 may block providing the virtual file system with the meta information for the first data loaded onto the native file system in the memory 210 as per the operation of the first function of the first application while providing the meta information including information for accessing at least one piece of second data in the folder or directory including the first data, loaded together onto the native file system in the memory 210 as per the operation of the first function of the first application.

According to an embodiment of the present disclosure, the meta information for the first and second data may include at least one of data name, data type, privilege to access, ownership information, data size, time varied, time accessed, data position, data attribute information, identification information, or a combination thereof.

The processor 260 may determine whether to permit to provide the virtual file system with the meta information including the information for accessing the first data in various manners based on the ownership information of the meta information for the first data.

According to an embodiment of the present disclosure, the processor 260 may determine whether the first user information with which a first application among at least one application installed on the electronic device 201 is executed is owner information among pieces of ownership information included in the meta information including the information for accessing the first data related to the first function of the first application.

For example, the processor 260 may determine whether one of the first user ID, first user password, or the first identification information allocated to each of the first user ID or first user password among pieces of the first user information matches owner among pieces of the ownership information included in the meta information for the first data.

When one of the first user ID, first user password, or the first identification information allocated to each of the first user ID or first user password among the pieces of the first user information matches owner among the pieces of the ownership information included in the meta information, the processor 260 may determine that the first user information is information about the owner included in the meta information for the first data. Unless one of the first user ID, first user password, or the first identification information allocated to each of the first user ID or first user password among the pieces of the first user information matches owner among the pieces of the ownership information included in the meta information, the processor 260 may determine that the first user information is not information about the owner included in the meta information for the first data.

When the first user information is information about the owner included in the meta information for the first data, the processor 260 may permit to provide the virtual file system with the meta information for the first data. For example, when the first user information is information about the owner included in the meta information for the first data, the processor 260 may permit to provide the virtual file system with the meta information for the first data loaded onto the native file system in the memory 210 of the electronic device 201 as per the operation of the first function of the first application.

Unless the first user information is information about the owner included in the meta information for the first data, the processor 260 may not permit to provide the virtual file system with the meta information for the first data. For example, unless the first user information is information about the owner included in the meta information for the first data, the processor 260 may not permit to provide the virtual file system with the meta information for the first data loaded onto the native file system in the memory 210 as per the operation of the first function of the first application.

According to an embodiment of the present disclosure, unless the first user information is the owner information included in the meta information for the first data, the processor 260 may determine whether the first user information is included in owner group information among the pieces of ownership information included in the meta information for the first data.

For example, the processor 260 may determine whether one of the first user group ID, first user group password, or the first identification information allocated to each of the first user group ID or first user group password among the pieces of the first user information is included in owner group information among the pieces of the ownership information included in the meta information for the first data.

When one of the first user group ID, first user group password, or the first identification information allocated to each of the first user group ID or first user group password among the pieces of the first user information is included in owner group information among the pieces of the ownership information included in the meta information, the processor 260 may determine that the first user information is the owner group information included in the meta information for the first data. Unless one of the first user group ID, first user group password, or the first identification information allocated to each of the first user group ID or first user group password among the pieces of the first user information is included in owner group information among the pieces of the ownership information included in the meta information, the processor 260 may determine that the first user information is not the owner group information included in the meta information for the first data.

When the first user information is the owner information or is included in the owner group information included in the meta information for the first data, the processor 260 may permit to provide the virtual file system with the meta information for the first data. For example, when the first user information is the owner information or is included in the owner group information included in the meta information for the first data, the processor 260 may permit to provide the virtual file system with the meta information for the first data loaded onto the native file system in the memory 210 as per the operation of the first function of the first application.

Unless the first user information is included in the owner group information included in the meta information for the first data, the processor 260 may not permit to provide the meta information for the first data. For example, unless the first user information is included in the owner group information included in the meta information for the first data, the processor 260 may not permit to provide the virtual file system with the meta information for the first data loaded onto the native file system in the memory as per the operation of the first function of the first application.

According to an embodiment of the present disclosure, unless the first user information matches the owner information, or is included in the owner group information, among the pieces of ownership information included in the meta information for the first data, the processor 260 may determine whether the first user information is information about other (third party) user included in the meta information for the first data.

For example, unless one of the first user ID, first user group ID, first user group ID, first user password, first user group password, or the first identification information allocated to each of the first user ID, first user group ID, first user password, or first user group password among the pieces of the first user information matches the owner information included in the meta information or is included in the owner group information included in the meta information, the processor 260 may determine that the first user information is information about other (third party) user among the pieces of ownership information included in the meta information for the first data. When one of the first user ID, first user group ID, first user group ID, first user password, first user group password, or the first identification information allocated to each of the first user ID, first user group ID, first user password, or first user group password among the pieces of the first user information matches the owner information included in the meta information or is included in the owner group information included in the meta information, the processor 260 may determine that the first user information is not the information about other (third party)

user among the pieces of ownership information included in the meta information for the first data.

When the first user information is information about other (third party) user among the pieces of ownership information included in the meta information for the first data, the processor 260 may not permit to provide the virtual file system with the meta information for the first data. For example, when the first user information is the information about the other (third party) user among the pieces of ownership information included in the meta information for the first data, the processor 260 may not permit to provide the virtual file system with the meta information for the first data loaded onto the native file system in the memory 210 as per the operation of the first function of the first application.

According to an embodiment of the present disclosure, when the first user information is not the owner information among the pieces of ownership information included in the meta information for the first data nor is the first user information included in the owner group information among the pieces of ownership information included in the meta information for the first data, the processor 260 may determine whether to permit to provide the virtual file system with the meta information for the first data based on security context among pieces of data attribute information (e.g., xattr) included in the meta information for the first data. The data attribute information (xattr) may include security context for the data (e.g., the first data).

According to an embodiment of the present disclosure, the security context may include at least one of context conditions for determining whether to permit to provide the meta information including the information for accessing the data (e.g., the first data), a blocked group, or a permitted group for providing the meta information for the data (e.g., the first data). The context conditions may be conditional conditions that vary depending on the context information related to the electronic device.

The processor 260 may determine whether to permit to provide the virtual file system with the meta information for the first data in various manners based on the security context.

For example, the processor 260 may identify the security context among the pieces of data attribute information included in the meta information for the first data.

According to an embodiment of the present disclosure, when the security context includes the permitted group for providing the meta information for the first data, the processor 260 may determine whether the first user information is included in the permitted group for providing the meta information for the first data included in the security context. When the first user information is included in the permitted group for providing the meta information for the first data, the processor 260 may permit to provide the virtual file system with the meta information for the first data. For example, when the first user information is included in the permitted group for providing the meta information for the first data, the processor 260 may permit to provide the virtual file system with the meta information for the first data loaded onto the native file system in the memory 210 as per the operation of the first function of the first application.

Unless the first user information is included in the permitted group for providing the meta information for the first data, the processor 260 may not permit to provide the virtual file system with the meta information for the first data. For example, unless the first user information is included in the permitted group for providing the meta information for the first data, the processor 260 may not permit to provide the virtual file system with the meta information for the first data loaded onto the file system in the memory 210 as per the operation of the first application.

According to an embodiment of the present disclosure, when the security context includes the blocked group for providing the meta information for the first data, the processor 260 may determine whether the first user information is included in the blocked group for providing the meta information for the first data included in the security context. When the first user information is included in the blocked group for providing the meta information for the first data, the processor 260 may not permit to provide the virtual file system with the meta information for the first data. For example, when the first user information is included in the blocked group for providing the meta information for the first data, the processor 260 may not permit to provide the virtual file system with the meta information for the first data loaded onto the native file system in the memory 210 as per the operation of the first function of the first application.

Unless the first user information is included in the blocked group for providing the meta information for the first data, the processor 260 may permit to provide the virtual file system with the meta information for the first data. For example, unless the first user information is included in the blocked group for providing the meta information for the first data, the processor 260 may permit to provide the virtual file system with the meta information for the first data loaded onto the native file system in the memory 210 as per the operation of the first function of the first application.

According to an embodiment of the present disclosure, when the security context includes the context condition, the processor 260 may detect context information related to the electronic device 201, which corresponds to the context condition, through at least one sensor 250. The processor 260 may determine whether the detected context information meets the context condition.

The processor 260 may determine whether the context information related to the electronic device 201 meets the context condition. When the context information meets the context condition, the processor 260 may permit to provide the virtual file system with the meta information for the first data.

According to an embodiment of the present disclosure, the context condition may include entry or exit of the electronic device 201 from a designated area.

According to an embodiment of the present disclosure, the context information related to the electronic device 201 may be location-based information related to the electronic device 201. The location-based information related to the electronic device 201 may be detected through at least one sensor (e.g., a GPS sensor).

According to an embodiment of the present disclosure, the processor 260 may determine whether the electronic device 201 enters the designated area (e.g., a security area of a company) based on the obtained location information. When the electronic device 201 is determined to have entered the designated area based on the obtained location information, the processor 260 may permit to provide the virtual file system with the meta information for the first data loaded onto the native file system in the memory 210 as per the operation of the first function of the first application.

Unless the electronic device 201 is determined to have entered the designated area based on the obtained location information, the processor 260 may not permit to provide the virtual file system with the meta information for the first data loaded onto the native file system in the memory 210 as per the operation of the first function of the first application.

According to an embodiment of the present disclosure, the processor 260 may determine whether the electronic device 201 exits the designated area (e.g., a security area of a company) based on the obtained location information. When the electronic device 201 is determined to have exited the designated area, i.e., when the electronic device 201 is positioned out of the designated area, based on the obtained location information, the processor 260 may not permit to provide the virtual file system with the meta information for the first data loaded onto the native file system in the memory 210 as per the operation of the first function of the first application. Unless the electronic device 201 is determined to have exited the designated area, i.e., when the electronic device 201 is positioned in the designated area, based on the obtained location information, the processor 260 may permit to provide the virtual file system with the meta information for the first data loaded onto the native file system in the memory 210 as per the operation of the first function of the first application.

The processor 260 may register a user account for using the electronic device 201 or at least one application installed on the electronic device 201 and generate a default container corresponding to the registered user account. The processor 260 may make a comparison with the registered user account upon pairing for communication with another electronic device 201. When connected with a device having the same user account, the electronic device 201 may be set as, e.g., host device, and the external electronic device connected with the electronic device 201 may be set as, e.g., client device. The host device and the client device may be synced with each other for their respective containers (not shown). When the accounts are different from each other, a container or personalized information (P-data) included therein may be coped or moved by the user's selection. In the default container, personal data stored based on container data level (or category) information managed by an account may be synced.

According to an embodiment of the present disclosure, the processor 260 may generate at least one container and manage each container generated. Containers generated may have their respective spaces physically isolated from each other. Each container generated may be independently managed in the user area (e.g., the user area 212 of FIG. 2 or a user area 310 of FIG. 3) of the memory 210. According to an embodiment of the present disclosure, at least one application installed in each generated container and data related to at least one function of the at least one application may be stored to share in separate shared data memories (or storage) formed in various storage devices in the hardware area (e.g., the hardware area 216 of FIG. 2 or the hardware area 330 of FIG. 3) in the memory 210.

The processor 260 may set a privilege for each generated container or the application installed in each container. The processor 260 may perform control to permit access and management by other containers according to the set privilege. The privilege settings on the container or application installed in the generated container may include a container access privilege, a container management privilege, and/or an app installation privilege. The privilege to access the container or application installed in the generated container may mean a privilege to permit access by other containers of the electronic device 201 or other containers of other connected electronic devices upon generating (including moving or copying) new containers. The container management privilege may mean a privilege set to permit to copy, move, sync, or delete the whole or some components of the container. The app installation privilege may set the category of apps that may be installed in the container.

The processor 260 may perform control to set a password for each container and store the set password in an isolated storage area, corresponding to the container. The processor 260 may perform authentication based on the set password when an external electronic device accesses at least one container stored in the memory 210.

Upon executing the application (or program) included in each container, the processor 260 may apply as set forth above in connection with whether to permit to provide the virtual file system with the meta information for the data related to the application (or program).

Although the major components of the electronic device 201 of FIG. 2 have been described in connection with various embodiments of the present disclosure, all of the components shown in FIG. 2 are not essential ones, and the electronic device 201 may rather be implemented with more or less components that those shown. The position of the major components described above in connection with FIG. 2 may be varied according to various embodiments of the present disclosure.

Figure 3:
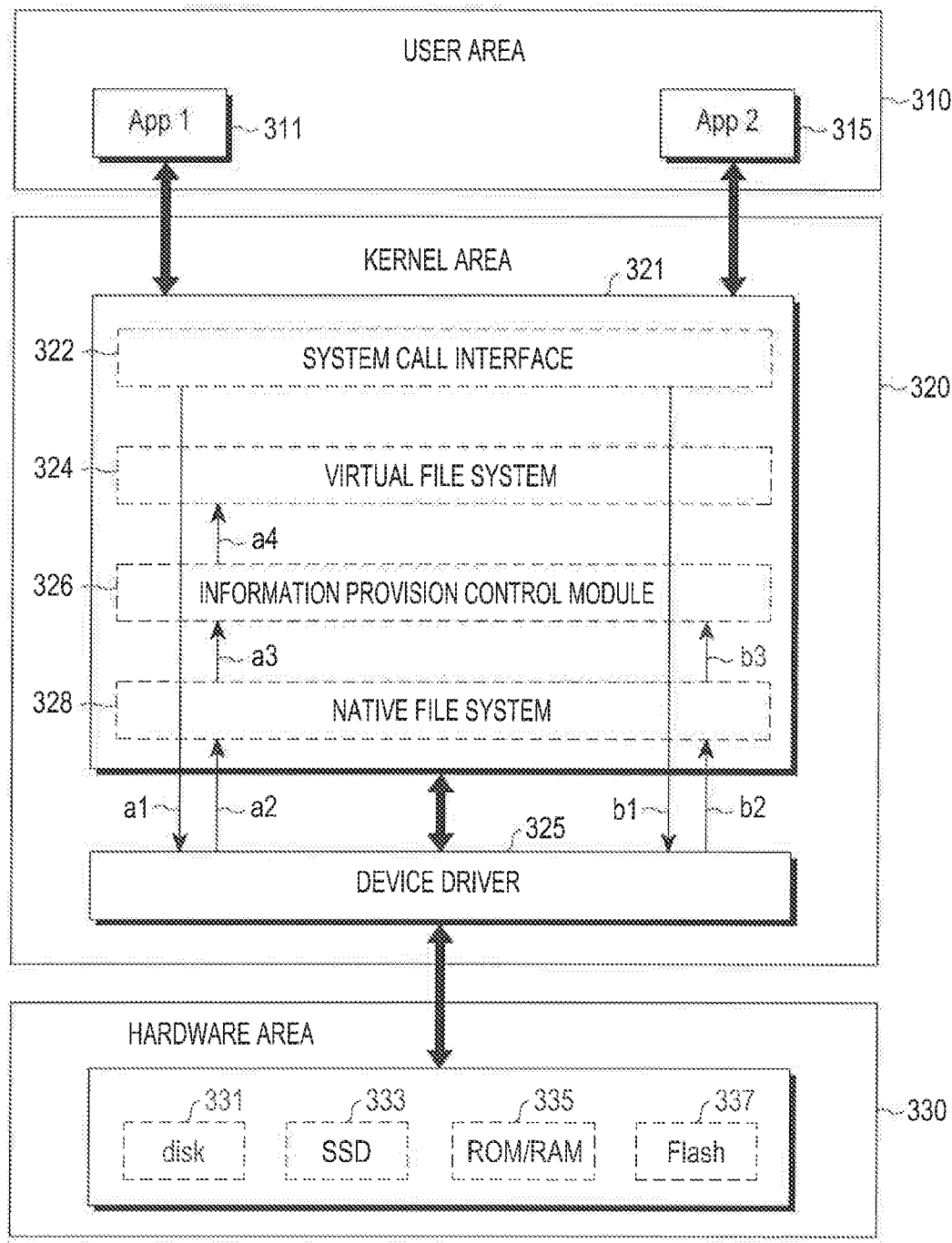
FIG. 3 is a block diagram illustrating a memory according to an embodiment of the present disclosure.

FIG. 3 is a block diagram illustrating a memory according to an embodiment of the present disclosure.

Referring to FIG. 3, according to an embodiment of the present disclosure, a memory (e.g., the memory 210 of FIG. 2) of an electronic device 201 may include a user area 310, a kernel area 320, and a hardware area 330.

The user area 310 is an area where at least one application (or program or container) may be executed. In the user area 310, e.g., a first application 311 (e.g., App1) or a second application 315 (e.g., App2) may be performed by a predetermined user.

The kernel area 320 may include a system resource manager 321 and a device driver 325.

The system resource manager 321 may perform control, allocation, or recovery of system resources. According to an embodiment of the present disclosure, the system resource manager 321 may include a process managing unit, a memory managing unit, or a file system managing unit.

The system resource manager 321 may include a system call interface 322, a virtual file system 324, an information provision control module 326, or a native file system 328.

The system call interface 322 may deliver a command as per a system call (e.g., open, readdir, or stat) according to the operation of a function of an application (or program or container) executed on the user area 310 to the kernel area 320. Meta information including information for accessing data related to the function of the application executed as per the system call may be loaded from the hardware area 330 to the native file system 328 by the device driver 325.

The information provision control module 326 may determine whether to provide the virtual file system 324 with the meta information for the data loaded onto the native file system 328 as per the operation of the function of the executed application based on the user information about the executed application. The information provision control module 326 may perform control as to whether to provide the meta information for the data loaded onto the native file system 328 to the virtual file system 324 (e.g., whether the virtual file system 324 has visibility for the data) according to a result of the determination. For example, when the first application 311 (e.g., App1) is executed on the user area 310, a system call for first data related to a first function of the executed first application 311 may be delivered through the system call interface 322 to the device driver 325 (a1), and meta information for the first data may be loaded from the corresponding physical storage device in the hardware area 330 to the native file system 328 through the device driver 325 as per the system call (a2). In this case, the information provision control module 326 may receive the meta information for the first data loaded onto the native file system 328 (a3), and the information provision control module 326 may determine whether to provide the virtual file system 324 with the meta information for the first data based on the meta information for the first data. When the meta information for the first data is determined to be provided to the virtual file system 324, the information provision control module 326 may provide the meta information for the first data to the virtual file system 324 (a4). The processor 260 may perform the first function of the first application 311 based on the meta information for the first data provided to the virtual file system 324.

For example, when the second application 315 (e.g., App2) is executed on the user area 310, a system call for second data related to a second function of the executed second application 315 may be delivered through the system call interface 322 to the device driver 325 (b1), and meta information for the second data may be loaded from the corresponding physical storage device in the hardware area 330 to the native file system 328 through the device driver 325 as per the system call (b2). In this case, the information provision control module 326 may receive the meta information for the second data loaded onto the native file system 328 (b3), and the information provision control module 326 may determine whether to provide the virtual file system 324 with the meta information for the second data based on the meta information for the second data. When the meta information for the second data is determined to be not provided to the virtual file system 324, the information provision control module 326 may not provide the meta information for the second data to the virtual file system 324. Since the meta information for the second data is not provided to the virtual file system 324, the processor 260 may not perform the second function of the second application 315.

Although FIG. 3 illustrates that the information provision control system 326 is provided separately between the virtual file system 324 and the native file system 328, various embodiments of the present disclosure are not limited thereto. For example, the information provision control module 326 may be included in the processor 260 of FIG. 2.

The native file system 328 may be one for managing data stored in the physical storage device in the hardware area 330 in the OS. The native file system 328 may include various policies defining interfaces or standards with the kernel area 320 for accessing the storage device to read or write data in the physical storage device in the hardware area 330. The native file system 328 may take various implementations depending on the policies. The native file system 328 may include at least one of, e.g., EXT2, EXT3, FAT, FAT32, NTFS, JFFS, JFFS, JFFS2, or ISO 9660. New native file systems may be added to the kernel area 320 depending on the policies. The native file system 328 may need to modify or recompile for compatibility with a new public version. When operated in a backward compatibility mode as the standards are varied in the OS, each native file system may be used, as it is, in the new OS version as well.

The virtual file system 324 may be a virtual file system layer formed on the native file system 328. The virtual file system 324 may be one for permitting the application or program (e.g., a user application program) to access various native file systems in the same manner. The virtual file system 324 may include policies defining interfaces or standards with the kernel area 320 and the native file system 328. The concept of object-oriented programming (OOP) overloading may primarily apply to the virtual file system 324. For example, when a system call occurs to, e.g., read/write/execute the data, the virtual file system 324 may be mapped to perform an operation suitable for the native file system 328 where the file belongs.

The device driver 325 may drive corresponding resources from the physical hardware area 330 to the kernel area 320. The device driver 325 may include, e.g., a display driver, a camera driver, a bluetooth driver, a memory driver, a USB driver, a keypad driver, a Wi-Fi driver, an audio driver, or an inter-process communication (IPC) driver. In this disclosure, the device driver may be, e.g., a memory driver.

The hardware area 330 may include a physical storage device for storing at least one application (or program or container) installed on the electronic device 201, data related to at least one function of each of the at least application, meta information including information for accessing the data, or substantial data including information related to the user. The physical storage device may include various types of storage devices, e.g., at least one of a disk 331 (e.g., hard disk drive), a solid state drive (SSD) 333, a ROM/RAM 335, or a flash memory 337.

Figure 4:
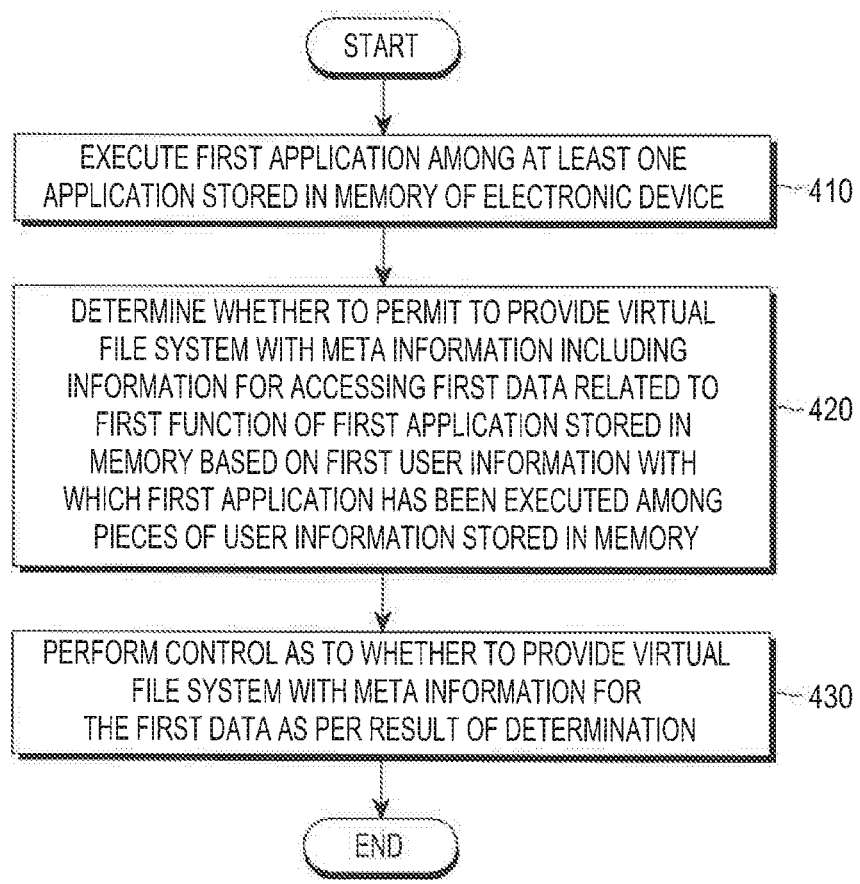
FIG. 4 is a flowchart illustrating a data management method in an electronic device according to an embodiment of the present disclosure.

FIG. 4 is a flowchart illustrating a data management method in an electronic device according to an embodiment of the present disclosure.

Referring to FIG. 4, the data management method may include operations 410 to 430. The data management method may be performed by an electronic device (e.g., the electronic device 101 or 201) or a processor (e.g., the processor 120 or 260) of the electronic device.

For example, in operation 410, the electronic device may execute a first application among at least one application stored in a memory (e.g., the memory 210 of FIG. 2) of the electronic device.

The memory of the electronic device may store the at least one application installed on the electronic device, data related to at least one function of each of the at least one application, the meta information including information for accessing the data, and user-related information.

The electronic device may execute the first application based on first data related to a first function of the first application stored in the memory among the at least one application stored in the memory.

For example, in operation 420, the electronic device may determine whether to permit to provide meta information including information for accessing the first data related to the first function of the first application stored in the memory based on first user information with which the first application is executed among pieces of user information stored in the memory.

For example, the electronic device may identify the operation of the first function of the first application related to the first data stored in the memory. According to an embodiment of the present disclosure, the operation of the first function of the first application may include the operation of reading, writing, or executing the first data from the first data in the memory or one of the folder or directory storing the first data. In response to the identification of the operation of the first function of the first application, the electronic device may determine whether to permit to provide the meta information including the information for accessing the first data based on the first user information with which the first application has been executed.

For example, in operation 430, the electronic device may perform control as to whether to provide the meta information about the first data to the virtual file system based on the results of the determination.

According to an embodiment of the present disclosure, upon determining that it is permitted to provide the meta information about the first data, the electronic device may provide the virtual file system with the meta information about the first data loaded onto the native file system in the memory as per the operation of the first function of the first application.

According to an embodiment of the present disclosure, upon determining that it is permitted to provide the meta information about the first data, the electronic device may provide the virtual file system with the meta information about the first data loaded onto the native file system in the memory as per the operation of the first function of the first application, together with the meta information including information for accessing at least one piece of second data in the folder or directory including the first data, loaded together onto the native file system in the memory as per the operation of the first function of the first application.

According to an embodiment of the present disclosure, upon determining that it is not permitted to provide the meta information about the first data, the electronic device may block providing the virtual file system with the meta information about the first data loaded onto the native file system in the memory as per the operation of the first function of the first application.

According to an embodiment of the present disclosure, upon determining that it is not permitted to provide the meta information about the first data, the electronic device may block providing the virtual file system with the meta information about the first data loaded onto the native file system in the memory as per the operation of the first function of the first application, together with the meta information including information for accessing at least one piece of second data in the folder or directory including the first data, loaded together onto the native file system in the memory as per the operation of the first function of the first application.

According to an embodiment of the present disclosure, upon determining that it is not permitted to provide the meta information about the first data, the electronic device may block providing the virtual file system with the meta information about the first data loaded onto the native file system in the memory as per the operation of the first function of the first application while providing the meta information including information for accessing at least one piece of second data in the folder or directory including the first data, loaded together onto the native file system in the memory as per the operation of the first function of the first application.

Figure 5:
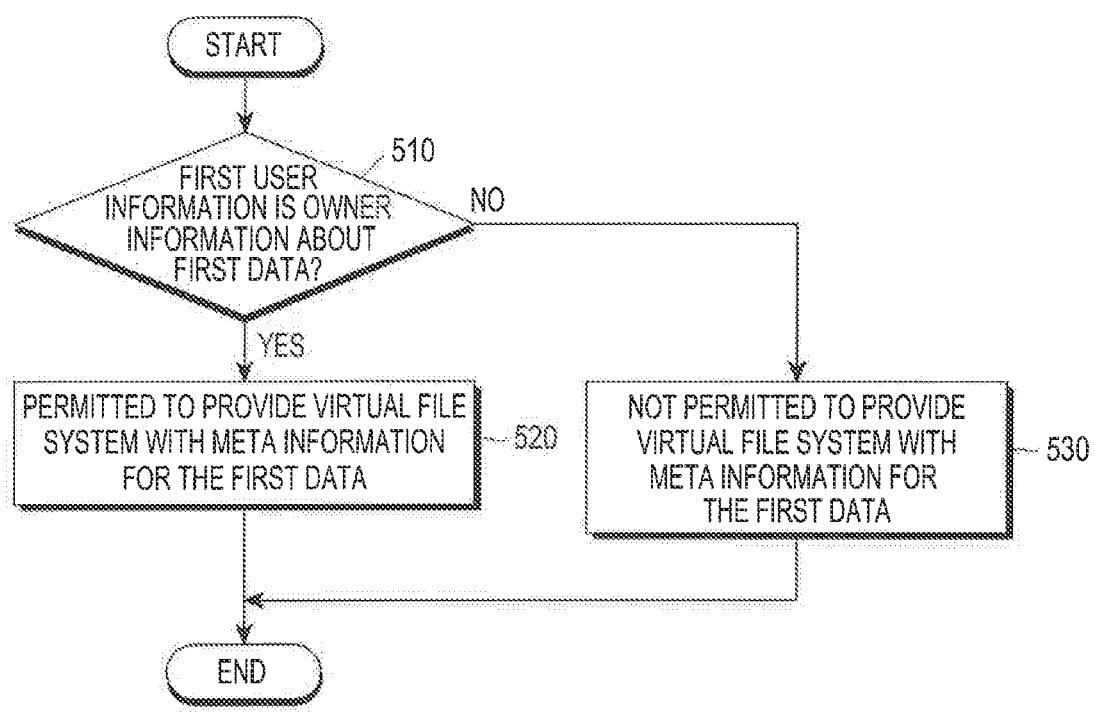
FIG. 5 is a flowchart illustrating a data management method in an electronic device according to an embodiment of the present disclosure.

FIG. 5 is a flowchart illustrating a data management method in an electronic device according to an embodiment of the present disclosure.

Referring to FIG. 5, the data management method relates to determining whether to permit to provide meta information including information for accessing the first data as denoted in operation 420 of FIG. 4, and the data management method may include operations 510 to 530. The data management method may be performed by an electronic device (e.g., the electronic device 101 or 201) or a processor (e.g., the processor 120 or 260) of the electronic device.

For example, in operation 510, the electronic device may determine whether the first user information with which a first application among at least one application stored in the electronic device is executed is owner information among pieces of ownership information included in the meta information including the information for accessing the first data related to the first function of the first application. In operation 510, when the first user information is the owner information among pieces of ownership information included in the meta information for the first data, the electronic device may perform operation 520, and unless the first user information is the owner information among the pieces of ownership information included in the meta information for the first data, the electronic device may perform operation 530.

According to an embodiment of the present disclosure, the first user information may be a first user account for the first application. The first user account may include, e.g., a first user ID, a first user password, or first identification information (e.g., inode number or i-number) allocated corresponding to each of the first user ID or first user password.

For example, in operation 520, when the first user information is the owner information among the pieces of ownership information included in the meta information for the first data, the electronic device may permit to provide the virtual file system (e.g., the virtual file system 324 of FIG. 3) with the meta information for the first data.

For example, when the first user information is the owner information among the pieces of ownership information included in the meta information for the first data, the electronic device may permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

In operation 530, unless the first user information is the owner information among the pieces of ownership information included in the meta information for the first data, the electronic device may not permit to provide the virtual file system with the meta information for the first data.

For example, unless the first user information is information about the owner included in the meta information for the first data, the electronic device may not permit to provide the virtual file system with the meta information for the first data loaded onto the native file system in the memory as per the operation of the first function of the first application.

Figure 6:
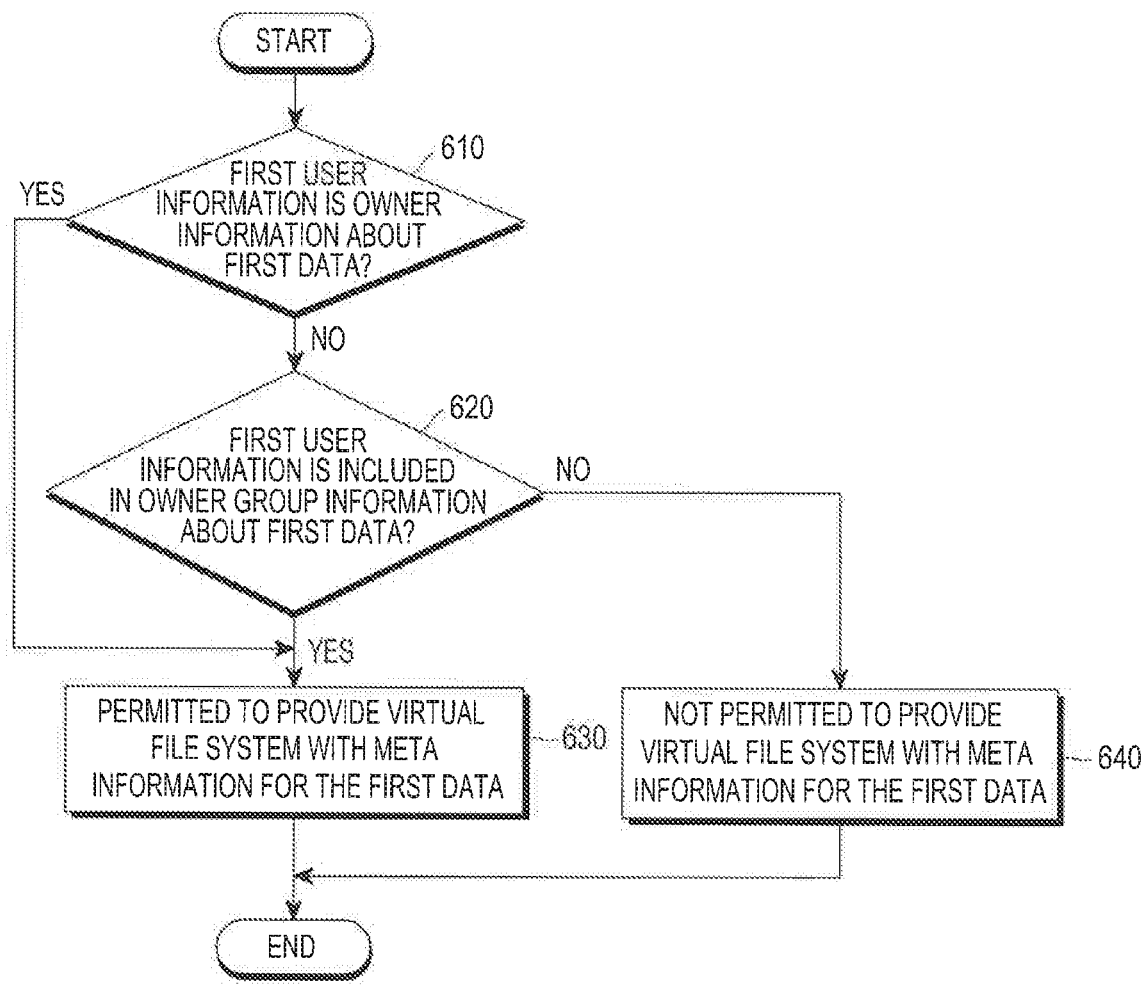
FIG. 6 is a flowchart illustrating a data management method in an electronic device according to an embodiment of the present disclosure.

FIG. 6 is a flowchart illustrating a data management method in an electronic device according to an embodiment of the present disclosure.

Referring to FIG. 6, the data management method relates to determining whether to permit to provide meta information including information for accessing the first data as denoted in operation 420 of FIG. 4, and the data management method may include operations 610 to 640. The data management method may be performed by an electronic device (e.g., the electronic device 101 or 201) or a processor (e.g., the processor 120 or 260) of the electronic device.

For example, in operation 610, the electronic device may determine whether the first user information with which a first application among at least one application stored in the electronic device is executed is owner information among pieces of ownership information included in the meta information including the information for accessing the first data related to the first function of the first application. In operation 610, unless the first user information is the owner information among the pieces of ownership information included in the meta information for the first data, the electronic device may perform operation 620, and when the first user information is the owner information among the pieces of ownership information included in the meta information for the first data, the electronic device may perform operation 630.

According to an embodiment of the present disclosure, the first user information may be a first user account for the first application. The first user account may include, e.g., a first ID, a first user group ID, a first user password, a first user group password, or first identification information (e.g., inode number or i-number) assigned corresponding to each of the first user ID, the first user group ID, the first user password, or the first user group password.

For example, the electronic device may determine whether one of the first user ID, first user password, or the first identification information allocated to each of the first user ID or first user password among pieces of the first user information matches owner among pieces of the ownership information included in the meta information for the first data.

When one of the first user ID, first user password, or the first identification information allocated to each of the first user ID or first user password among the pieces of the first user information matches owner among the pieces of the ownership information included in the meta information, the electronic device may determine that the first user information is information about the owner included in the meta information for the first data. Unless one of the first user ID, first user password, or the first identification information allocated to each of the first user ID or first user password among the pieces of the first user information matches owner among the pieces of the ownership information included in the meta information, the electronic device may determine that the first user information is not information about the owner included in the meta information for the first data.

In operation 620, unless the first user information is the owner information among the pieces of ownership information included in the meta information for the first data, the electronic device may determine whether the first user information is included in the owner group information among the pieces of ownership information included in the meta information for the first data. In operation 620, when the first user information is included in the owner group information among the pieces of ownership information included in the meta information for the first data, the electronic device may perform operation 630, and unless the first user information is included in the owner group information among the pieces of ownership information included in the meta information for the first data, the electronic device may perform operation 640.

The electronic device may determine whether one of the first user group ID, first user group password, or the first identification information allocated to each of the first user group ID or first user group password among the pieces of the first user information is included in the owner group information among the pieces of the ownership information included in the meta information for the first data.

When one of the first user group ID, first user group password, or the first identification information allocated to each of the first user group ID or first user group password among the pieces of the first user information is included in the owner group information among the pieces of the ownership information included in the meta information, the electronic device may determine that the first user information is included in the owner group information included in the meta information for the first data. Unless one of the first user group ID, first user group password, or the first identification information allocated to each of the first user group ID or first user group password among the pieces of the first user information is included in the owner group information among the pieces of the ownership information included in the meta information, the electronic device may determine that the first user information is not included in the owner group information included in the meta information for the first data.

For example, in operation 630, when the first user information is the owner information or is included in the owner group information among the pieces of ownership information included in the meta information for the first data, the electronic device may permit to provide the virtual file system (e.g., the virtual file system 324 of FIG. 3) with the meta information for the first data.

For example, when the first user information is the owner information or is included in the owner group information among the pieces of ownership information included in the meta information for the first data, the electronic device may permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

In operation 640, unless the first user information is included in the owner group information among the pieces of ownership information included in the meta information for the first data, the electronic device may not permit to provide the meta information for the first data.

For example, unless the first user information is included in the owner group information included in the meta information for the first data, the electronic device may not permit to provide the virtual file system with the meta information for the first data loaded onto the native file system in the memory as per the operation of the first function of the first application.

Figure 7:
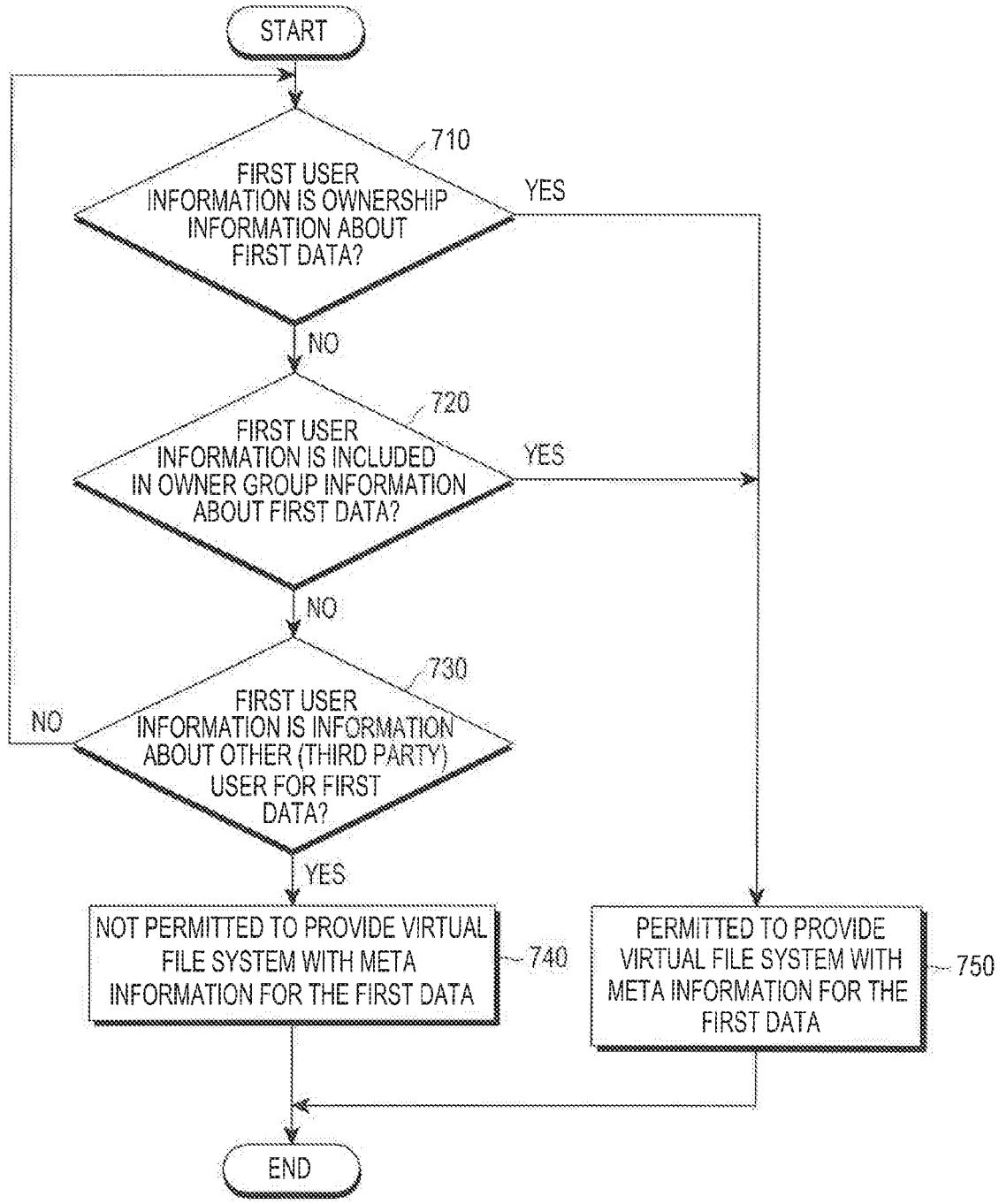
FIG. 7 is a flowchart illustrating a data management method in an electronic device according to an embodiment of the present disclosure.

FIG. 7 is a flowchart illustrating a data management method in an electronic device according to an embodiment of the present disclosure.

Referring to FIG. 7, the data management method relates to determining whether to permit to provide meta information including information for accessing the first data as denoted in operation 420 of FIG. 4, and the data management method may include operations 710 to 750. The data management method may be performed by an electronic device (e.g., the electronic device 101 or 201) or a processor (e.g., the processor 120 or 260) of the electronic device.

For example, in operation 710, the electronic device may determine whether the first user information with which a first application among at least one application installed on the electronic device is executed is owner information among pieces of ownership information included in the meta information including the information for accessing the first data related to the first function of the first application. In operation 710, unless the first user information is the owner information among the pieces of ownership information included in the meta information for the first data, the electronic device may perform operation 720, and when the first user information is the owner information among the pieces of ownership information included in the meta information for the first data, the electronic device may perform operation 750.

Operation 710 is the same as operation 610 of FIG. 6, and thus, the description of operation 610 may apply to operation 710.

For example, in operation 720, unless the first user information is the owner information among the pieces of ownership information included in the meta information for the first data, the electronic device may determine whether the first user information is included in the owner group information among the pieces of ownership information included in the meta information for the first data. In operation 720, unless the first user information is included in the owner group information among the pieces of ownership information included in the meta information for the first data, the electronic device may perform operation 730, and when the first user information is included in the owner group information among the pieces of ownership information included in the meta information for the first data, the electronic device may perform operation 750.

Operation 720 is the same as operation 620 of FIG. 6, and thus, the description of operation 620 may apply to operation 720.

For example, in operation 730, unless the first user information is included in the owner group information among the pieces of ownership information included in the meta information for the first data, the electronic device may determine whether the first user information is information about other (third party) user among the pieces of ownership information included in the meta information for the first data. In operation 730, when the first user information is information about other (third party) user among the pieces of ownership information included in the meta information for the first data, the electronic device may perform operation 740, and unless the first user information is the information about other (third party) user among the pieces of ownership information included in the meta information for the first data, the electronic device may repeat operation 710.

Unless one of the first user ID, first user group ID, first user group ID, first user password, first user group password, or the first identification information allocated to each of the first user ID, first user group ID, first user password, or first user group password among the pieces of the first user information matches the owner information included in the meta information or is included in the owner group information included in the meta information, the electronic device may determine that the first user information is information about other (third party) user among the pieces of ownership information included in the meta information for the first data. When one of the first user ID, first user group ID, first user group ID, first user password, first user group password, or the first identification information allocated to each of the first user ID, first user group ID, first user password, or first user group password among the pieces of the first user information matches the owner information included in the meta information or is included in the owner group information included in the meta information, the electronic device may determine that the first user information is not the information about other (third party) user among the pieces of ownership information included in the meta information for the first data.

For example, in operation 740, when the first user information is information about other (third party) user among the pieces of ownership information included in the meta information for the first data, the electronic device may not permit to provide the virtual file system with the meta information for the first data.

For example, when the first user information is the information about other (third party) user among the pieces of ownership information included in the meta information for the first data, the electronic device may not permit to provide the virtual file system with the meta information for the first data loaded onto the native file system in the memory (e.g., the memory 260 of FIG. 2) of the electronic device as per the operation of the first function of the first application.

For example, in operation 750, when the first user information is the owner information or is included in the owner group information among the pieces of ownership information included in the meta information for the first data, the electronic device may permit to provide the virtual file system (e.g., the virtual file system 324 of FIG. 3) with the meta information for the first data.

For example, when the first user information is the owner information or is included in the owner group information among the pieces of ownership information included in the meta information for the first data, the electronic device may permit to provide the virtual file system with the meta information for the first data loaded on a native file system (e.g., the native file system 328 of FIG. 3) in the memory of the electronic device as per the operation of the first function of the first application.

Figure 8:
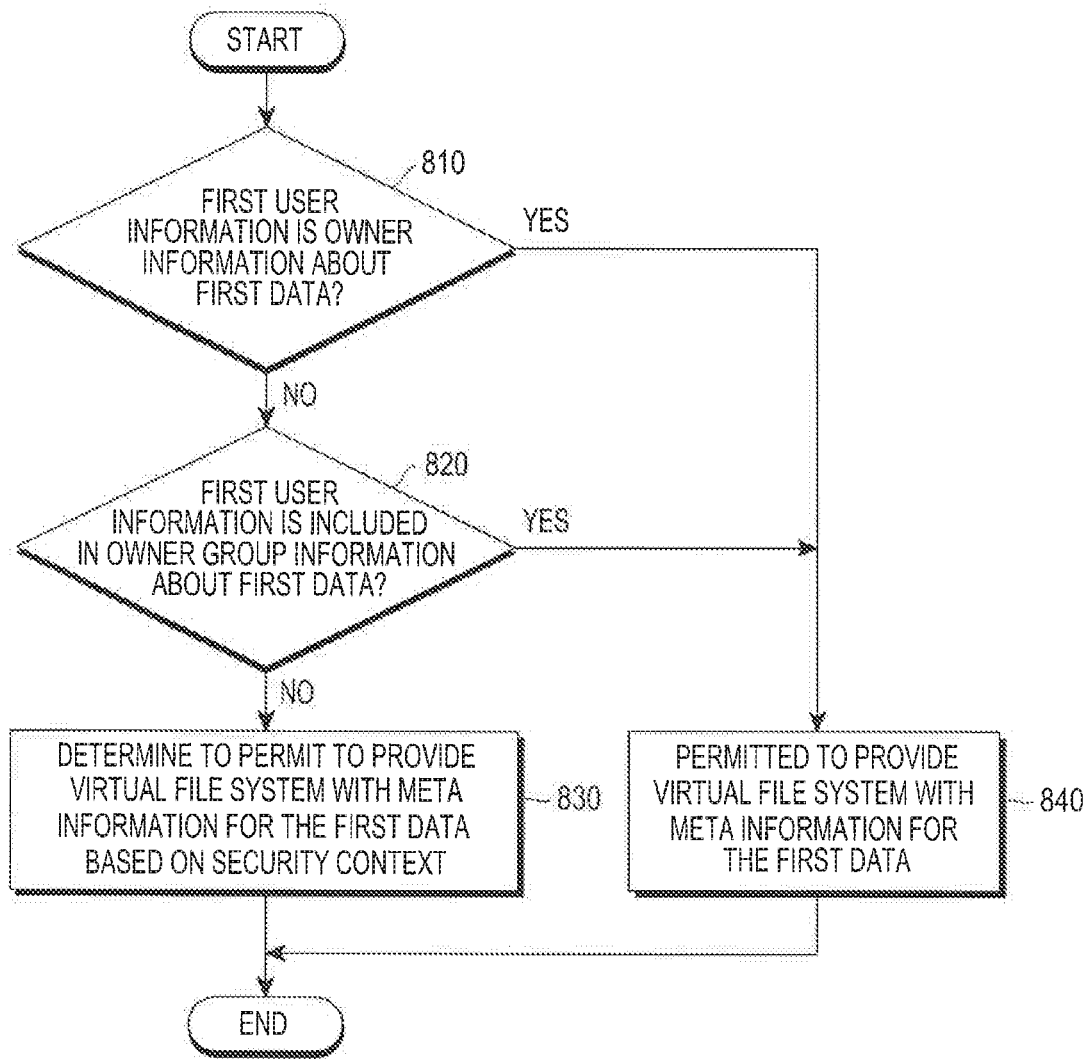
FIG. 8 is a flowchart illustrating a data management method in an electronic device according to an embodiment of the present disclosure.

FIG. 8 is a flowchart illustrating a data management method in an electronic device according to an embodiment of the present disclosure.

Referring to FIG. 8, the data management method relates to determining whether to permit to provide meta information including information for accessing the first data as denoted in operation 420 of FIG. 4, and the data management method may include operations 810 to 840. The data management method may be performed by an electronic device (e.g., the electronic device 101 or 201) or a processor (e.g., the processor 120 or 260) of the electronic device.

For example, in operation 810, the electronic device may determine whether the first user information with which a first application among at least one application installed on the electronic device is executed is owner information among pieces of ownership information included in the meta information including the information for accessing the first data related to the first function of the first application. In operation 810, unless the first user information is the owner information among the pieces of ownership information included in the meta information for the first data, the electronic device may perform operation 820, and when the first user information is the owner information among the pieces of ownership information included in the meta information for the first data, the electronic device may perform operation 840.

Operation 810 is the same as operation 610 of FIG. 6, and thus, the description of operation 610 may apply to operation 810.

For example, in operation 820, unless the first user information is the owner information among the pieces of ownership information included in the meta information for the first data, the electronic device may determine whether the first user information is included in the owner group information among the pieces of ownership information included in the meta information for the first data. In operation 820, unless the first user information is included in the owner group information among the pieces of ownership information included in the meta information for the first data, the electronic device may perform operation 830, and when the first user information is included in the owner group information among the pieces of ownership information included in the meta information for the first data, the electronic device may perform operation 840.

Operation 820 is the same as operation 620 of FIG. 6, and thus, the description of operation 620 may apply to operation 820.

For example, in operation 830, unless the first user information is included in the owner group information among the pieces of ownership information included in the meta information for the first data, the electronic device may determine whether to permit to provide the virtual file system with the meta information for the first data based on the security context among the pieces of data attribute information included in the meta information for the first data.

According to an embodiment of the present disclosure, the security context may include at least one of context conditions for determining whether to permit to provide the meta information for the first data, a blocked group, or a permitted group for providing the meta information for the first data. The context conditions may be conditional conditions that vary depending on the context information related to the electronic device.

For example, in operation 840, when the first user information is the owner information or is included in the owner group information among the pieces of ownership information included in the meta information for the first data, the electronic device may permit to provide the virtual file system (e.g., the virtual file system 324 of FIG. 3) with the meta information for the first data.

For example, when the first user information is the owner information or is included in the owner group information among the pieces of ownership information included in the meta information for the first data, the electronic device may permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

Figure 9:
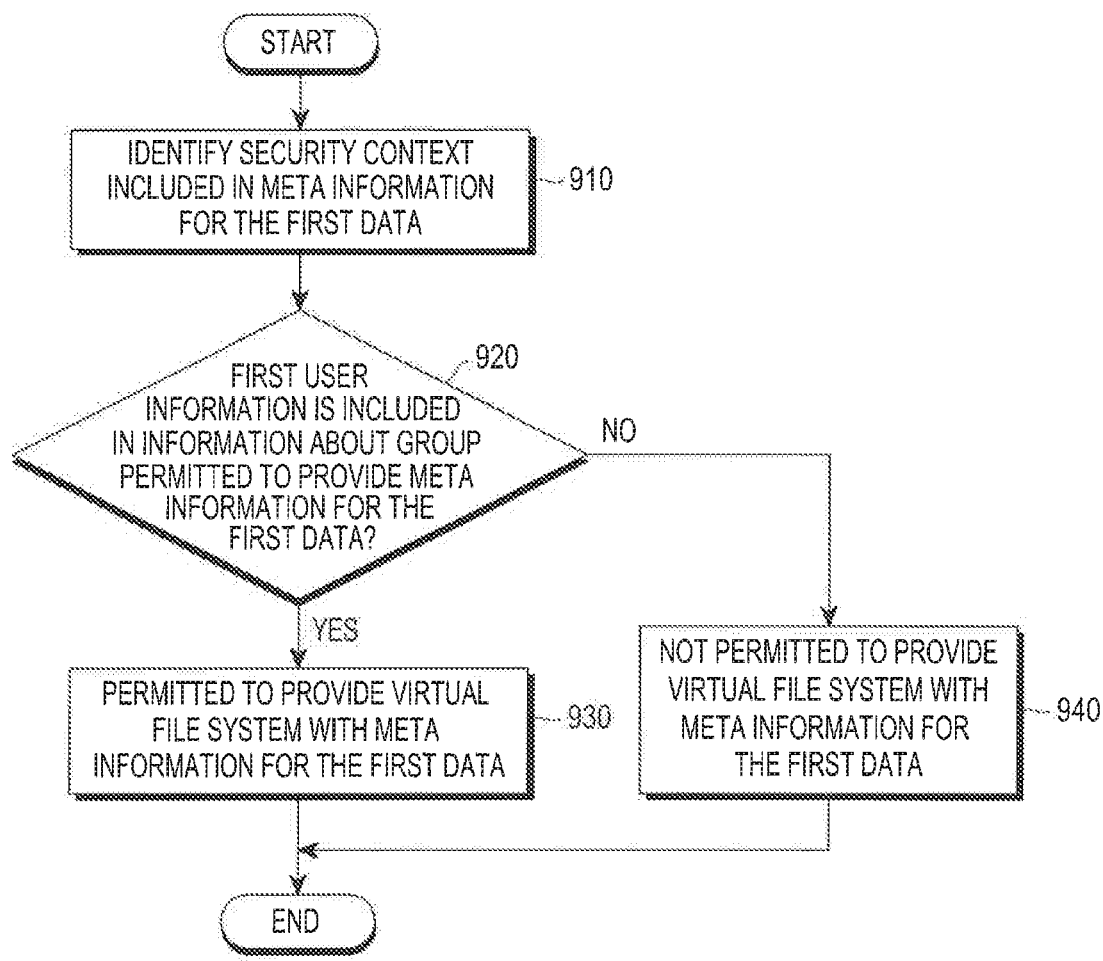
FIG. 9 is a flowchart illustrating a data management method in an electronic device according to an embodiment of the present disclosure.

FIG. 9 is a flowchart illustrating a data management method in an electronic device according to an embodiment of the present disclosure.

Referring to FIG. 9, the data management method relates to determining whether to permit to provide a virtual file system with meta information including information for accessing the first data based on the security context among the pieces of data attribute information included in the meta information for the first data as denoted in operation 830 of FIG. 8, and the data management method may include operations 910 to 940. The data management method may be performed by an electronic device (e.g., the electronic device 101 or 201) or a processor (e.g., the processor 120 or 260) of the electronic device.

For example, in operation 910, the electronic device may identify the security context among the pieces of data attribute information (e.g., xattr) included in meta information including information for accessing first data related to a first function of a first application among at least one application stored in the electronic device.

According to an embodiment of the present disclosure, the security context may include a group permitted to provide the meta information for the first data.

For example, in operation 920, the electronic device may determine whether first user information with which the first application is executed is included in information about the group permitted to provide the meta information for the first data which is included in the security context. In operation 920, when the first user information is included in the information about the permitted group, the electronic device may perform operation 930, and unless the first user information is included in the permitted group information, the electronic device may perform operation 940.

For example, in operation 930, when the first user information is included in the information about the group permitted to provide the meta information for the first data, the electronic device may permit to provide the virtual file system (e.g., the virtual file system 324 of FIG. 3) with the meta information for the first data.

For example, when the first user information is included in the information about the group permitted to provide the meta information for the first data, the electronic device may permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

In operation 940, unless the first user information is included in the group permitted to provide the meta information for the first data, the electronic device may not permit to provide the virtual file system with the meta information for the first data.

For example, unless the first user information is included in the information about the group permitted to provide the meta information for the first data, the electronic device may not permit to provide the virtual file system with the meta information for the first data loaded onto the native file system in the memory as per the operation of the first function of the first application.

Figure 10:
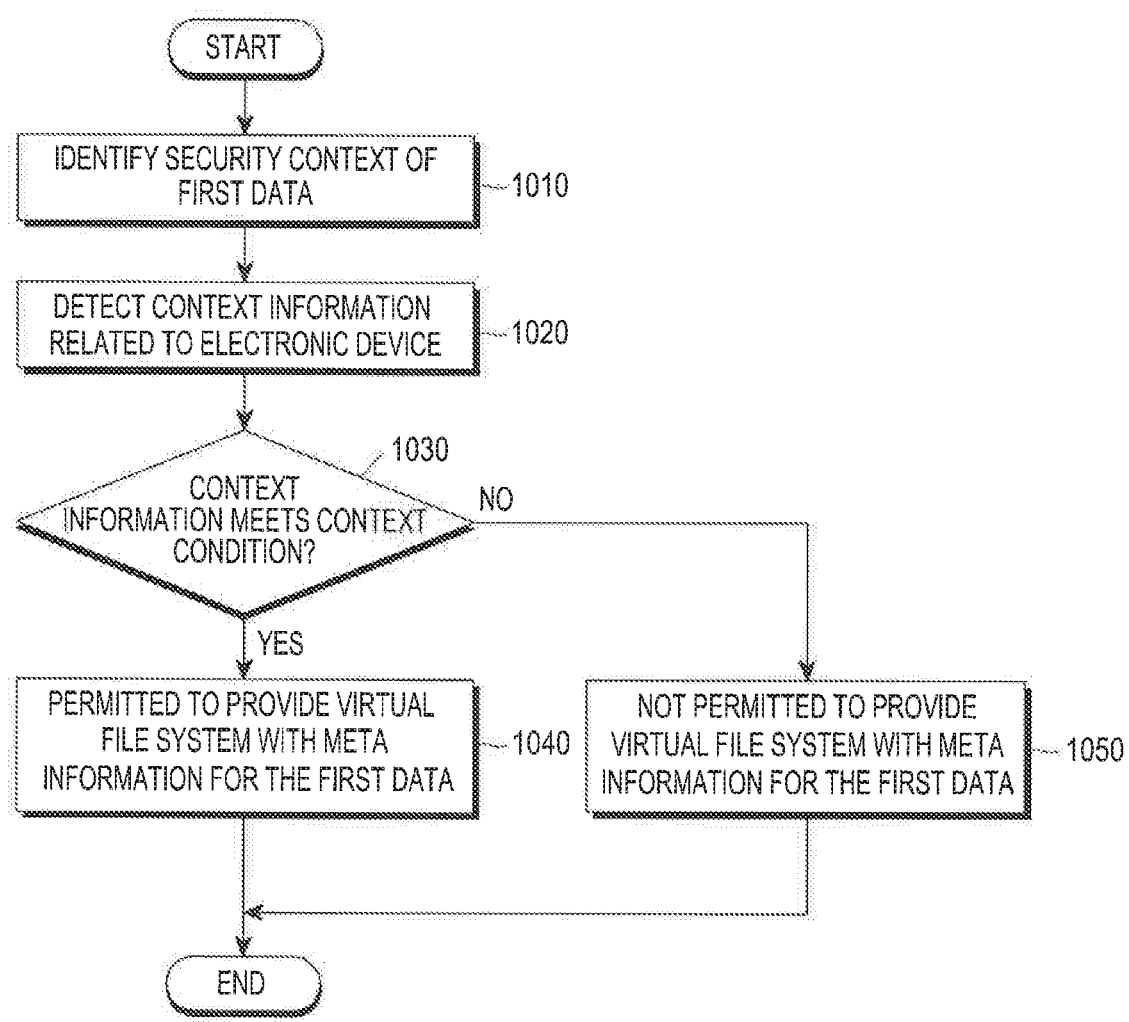
FIG. 10 is a flowchart illustrating a data management method in an electronic device according to an embodiment of the present disclosure.

FIG. 10 is a flowchart illustrating a data management method in an electronic device according to an embodiment of the present disclosure.

Referring to FIG. 10, the data management method relates to determining whether to permit to provide a virtual file system with meta information including information for accessing the first data based on the security context among the pieces of data attribute information included in the meta information for the first data as denoted in operation 830 of FIG. 8, and the data management method may include operations 1010 to 1050. The data management method may be performed by an electronic device (e.g., the electronic device 101 or 201) or a processor (e.g., the processor 120 or 260) of the electronic device.

For example, in operation 1010, the electronic device may identify the security context among the pieces of data attribute information (e.g., xattr) included in meta information including information for accessing first data related to a first function of a first application among at least one application stored in the electronic device.

According to an embodiment of the present disclosure, the security context may include context conditions for determining whether to provide the meta information for the first data. The context conditions may be conditional conditions that vary depending on the context information related to the electronic device.

According to an embodiment of the present disclosure, the context condition may include entry or exit of the electronic device from a designated area.

For example, in operation 1020, the electronic device may detect context information related to the electronic device corresponding to the context condition.

For example, the electronic device may detect the context information related to the electronic device through at least one sensor (e.g., the sensor 260 of FIG. 2).

According to an embodiment of the present disclosure, the context information may be location-based information about the electronic device, and at least one sensor of the electronic device may include a location-based sensor (e.g., a GPS sensor). The electronic device may detect the location-based information about the electronic device through the location-based sensor.

For example, in operation 1030, the electronic device may determine whether the context information related to the electronic device meets the context condition. In operation 1030, when the context information meets the context condition, the electronic device may perform operation 1040, and when the context information fails to meet the context condition, the electronic device may perform operation 1050.

For example, the electronic device may obtain location information about the electronic device based on the context information (e.g., location-based information about the electronic device) detected through at least one sensor.

According to an embodiment of the present disclosure, the electronic device may determine whether the electronic device enters a designated area (e.g., a security area of a company) based on the obtained location information.

For example, in operation 1040, when the context information meets the context condition, the electronic device may permit to provide the virtual file system (e.g., the virtual file system 324 of FIG. 3) with the meta information for the first data.

When the electronic device is determined in operation 1030 to have entered the designated area based on the obtained location information, the electronic device may permit to provide the virtual file system with the meta information for the first data loaded onto the native file system (e.g., the native file system 328 of FIG. 3) in the memory (e.g., the memory 210 of FIG. 2) of the electronic device as per the operation of the first function of the first application.

For example, in operation 1050, when the context condition fails to meet the context condition, the electronic device may not permit to provide the virtual file system with the meta information for the first data.

Unless the electronic device is determined in operation 1030 to have entered the designated area based on the obtained location information, the electronic device may not permit to provide the virtual file system with the meta information for the first data loaded onto the native file system in the memory as per the operation of the first function of the first application.

Although not shown in FIG. 10, operations 1030 to 1050 may also be performed as follows. For example, in operation 1030, the electronic device may determine whether the electronic device exits a designated area (e.g., a security area of a company) based on the obtained location information. When the electronic device is determined to have exited the designated area, i.e., when the electronic device is positioned out of the designated area, based on the obtained location information, the electronic device may not permit to provide the virtual file system with the meta information for the first data loaded onto the native file system in the memory as per the operation of the first function of the first application in operation 1040. Unless the electronic device is determined to have exited the designated area, i.e., when the electronic device is positioned out of the designated area, based on the obtained location information, the electronic device may not permit to provide the virtual file system with the meta information for the first data loaded onto the native file system in the memory as per the operation of the first function of the first application in operation 1050.

Figure 11:
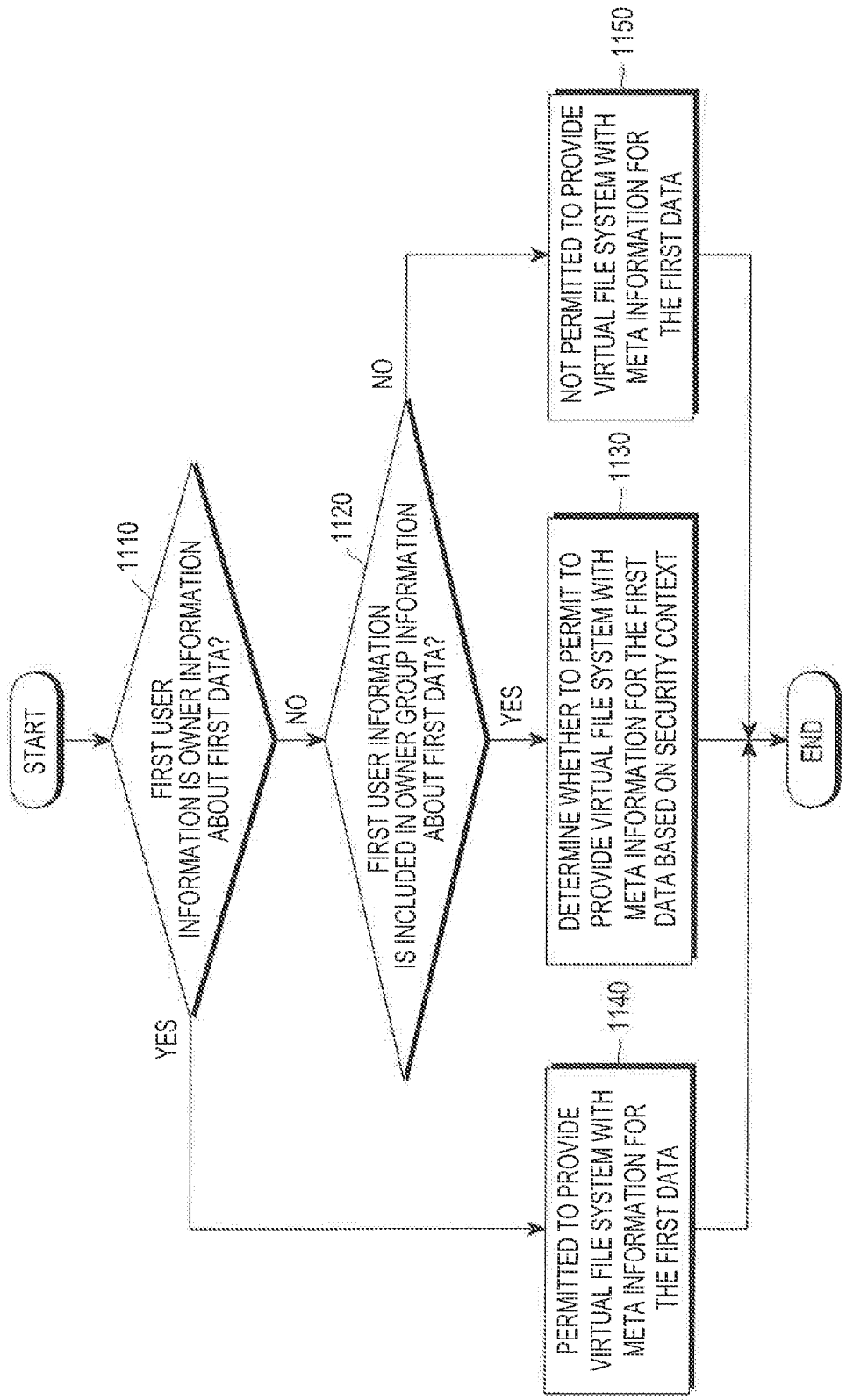
FIG. 11 is a flowchart illustrating a data management method in an electronic device according to an embodiment of the present disclosure.

FIG. 11 is a flowchart illustrating a data management method in an electronic device according to an embodiment of the present disclosure.

Referring to FIG. 11, the data management method relates to determining whether to permit to provide meta information including information for accessing the first data as denoted in operation 420 of FIG. 4, and the data management method may include operations 1110 to 1150. The data management method may be performed by an electronic device (e.g., the electronic device 101 or 201) or a processor (e.g., the processor 120 or 260) of the electronic device.

For example, in operation 1110, the electronic device may determine whether the first user information with which a first application among at least one application stored in the electronic device is executed is owner information among pieces of ownership information included in the meta information including the information for accessing the first data related to the first function of the first application. In operation 1110, unless the first user information is the owner information among the pieces of ownership information included in the meta information for the first data, the electronic device may perform operation 1120, and when the first user information is the owner information among the pieces of ownership information included in the meta information for the first data, the electronic device may perform operation 1140.

Operation 1110 is the same as operation 610 of FIG. 6, and thus, the description of operation 610 may apply to operation 1110.

For example, in operation 1120, unless the first user information is the owner information among the pieces of ownership information included in the meta information for the first data, the electronic device may determine whether the first user information is included in the owner group information among the pieces of ownership information included in the meta information for the first data. In operation 1120, when the first user information is included in the owner group information among the pieces of ownership information included in the meta information for the first data, the electronic device may perform operation 1130, and unless the first user information is included in the owner group information among the pieces of ownership information included in the meta information for the first data, the electronic device may perform operation 1150.

Operation 1120 is the same as operation 620 of FIG. 6, and thus, the description of operation 620 may apply to operation 1120.

For example, in operation 1130, unless the first user information is included in the owner group information among the pieces of ownership information included in the meta information for the first data, the electronic device may determine whether to permit to provide the virtual file system with the meta information for the first data based on the security context among the pieces of data attribute information included in the meta information for the first data.

According to an embodiment of the present disclosure, the security context may include at least one of context conditions for determining whether to permit to provide the meta information for the first data, a blocked group, or a permitted group for providing the meta information for the first data. The context conditions may be conditional conditions that vary depending on the context information related to the electronic device.

For example, in operation 1140, when the first user information is the owner information among the pieces of ownership information included in the meta information for the first data, the electronic device may permit to provide the virtual file system (e.g., the virtual file system 324 of FIG. 3) with the meta information for the first data. For example, when the first user information is the owner information among the pieces of ownership information included in the meta information for the first data, the electronic device may permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

For example, in operation 1150, unless the first user information is the owner information or is included in the owner group information among the pieces of ownership information included in the meta information for the first data, the electronic device may not permit to provide the virtual file system with the meta information for the first data.

For example, unless the first user information is the owner information or is included in the owner group information included in the meta information for the first data, the electronic device may not permit to provide the virtual file system with the meta information for the first data loaded onto the native file system in the memory as per the operation of the first function of the first application.

Figure 12:
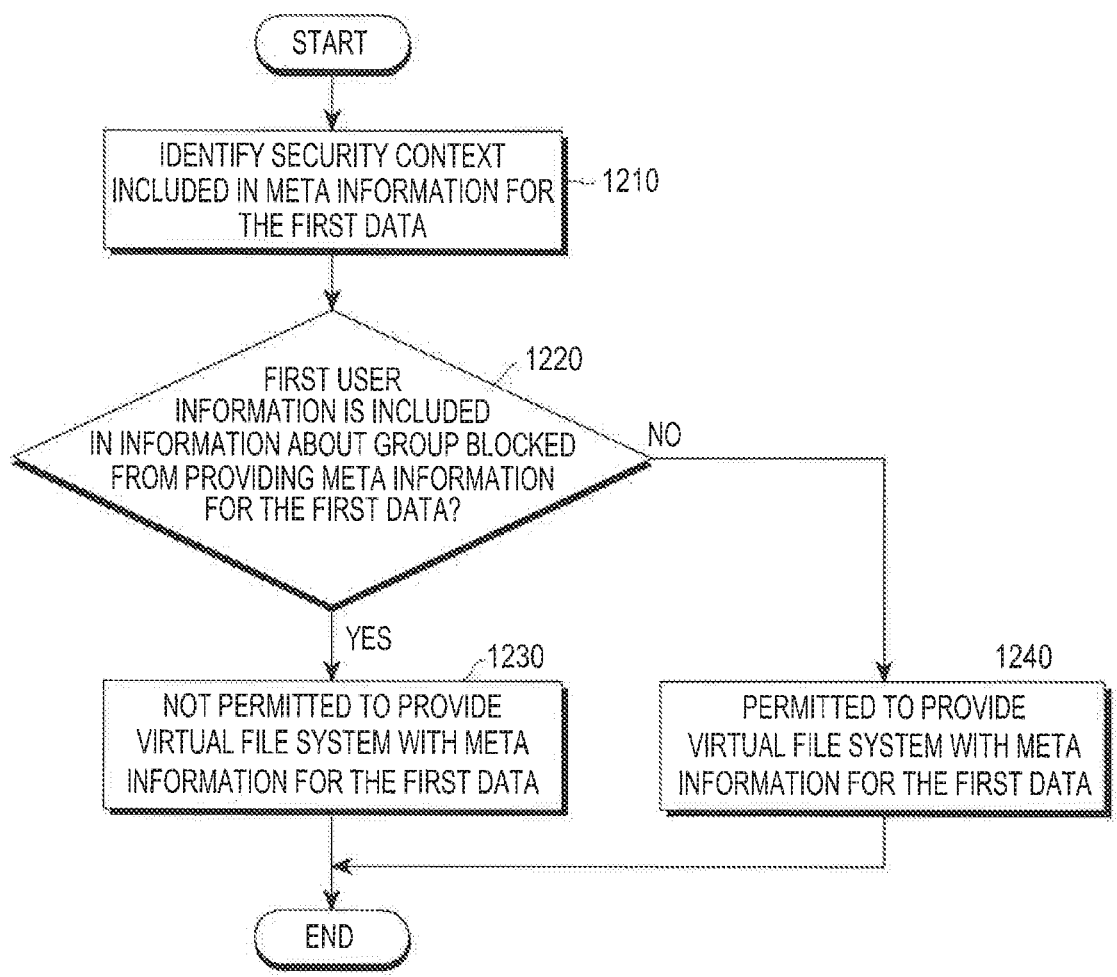
FIG. 12 is a flowchart illustrating a data management method in an electronic device according to an embodiment of the present disclosure.

FIG. 12 is a flowchart illustrating a data management method in an electronic device according to an embodiment of the present disclosure.

Referring to FIG. 12, the data management method relates to determining whether to permit to provide a virtual file system with meta information including information for accessing the first data based on the security context among the pieces of data attribute information included in the meta information for the first data as denoted in operation 1130 of FIG. 11, and the data management method may include operations 1210 to 1240. The data management method may be performed by an electronic device (e.g., the electronic device 101 or 201) or a processor (e.g., the processor 120 or 260) of the electronic device.

For example, in operation 1210, the electronic device may identify the security context among the pieces of data attribute information (e.g., xattr) included in meta information including information for accessing first data related to a first function of a first application among at least one application installed on the electronic device.

According to an embodiment of the present disclosure, the security context may include a group blocked from providing the meta information for the first data.

For example, in operation 1220, the electronic device may determine whether first user information with which the first application is executed is included in information about the group blocked from providing the meta information for the first data which is included in the security context. In operation 1220, when the first user information is included in the information about the blocked group, the electronic device may perform operation 1230, and unless the first user information is included in the blocked group information, the electronic device may perform operation 1240.

For example, in operation 1230, when the first user information is included in the information about the group blocked from providing the meta information for the first data, the electronic device may not permit to provide the virtual file system (e.g., the virtual file system 324 of FIG. 3) with the meta information for the first data.

For example, when the first user information is included in the information about the group blocked from providing the meta information for the first data, the electronic device may not permit to provide the virtual file system with the meta information for the first data loaded on a native file system (e.g., the native file system 328 of FIG. 3) in the memory (e.g., the memory 210 of FIG. 2) of the electronic device as per the operation of the first function of the first application.

For example, in operation 1240, unless the first user information is included in the group blocked from providing the meta information for the first data, the electronic device may permit to provide the virtual file system with the meta information for the first data.

For example, unless the first user information is included in the information about the group blocked from providing the meta information for the first data, the electronic device may permit to provide the virtual file system with the meta information for the first data loaded onto the native file system in the memory as per the operation of the first function of the first application.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a computer readable recording medium recording a program running on a computer, the program including executable commands executed by a processor to enable the processor to execute a first application among at least one application stored in a memory of the electronic device, determine whether to permit to provide meta information including information for accessing first data related to a first function of the first application stored in the memory based on first user information with which the first application is executed among pieces of user information stored in the memory, and perform control as to whether to provide a virtual file system with the meta information for the first data as a result of the determination.

As is apparent from the foregoing description, according to various embodiments of the present disclosure, it is possible to fundamentally block malicious applications (or programs) or processes that malicious applications (or programs) are running from recognizing the presence or absence of data stored in the memory by performing control as to whether to permit to provide the virtual file system with meta information including information for accessing each piece of data (e.g., file, folder, or directory) stored in the memory of the electronic device. Thus, enhanced security may be attained for the data.

The data stored in the memory may be protected without making changes in configuration to the memory. It is not required to define and register policies for controlling access to data as adopted in access control technology of the related art, thus saving resources. Even where confidential data and non-confidential data are mixed, the folder or directory including the data need not reconfigure, preventing waste of memory. Therefore, the system performance of the electronic device may overall be enhanced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a memory; and
 at least one processor configured to:
  execute a first application among at least one application stored in the memory,
  determine whether to provide to, a virtual file system, meta information for first data related to a first function of the first application based on first user information with which the first application is executed, the meta information for the first data including information for accessing the first data stored in the memory,
  determine whether to provide, to the virtual file system, meta information for accessing at least one piece of second data in a folder or a directory including the first data based on the first user information with which the first application is executed, the at least one piece of second data being unrelated to the first function of the first application,
  provide, to the virtual file system, the meta information for the first data, upon determining that the virtual file system is permitted to perform the first function of the first application based on the first user information,
  provide, to the virtual file system, the meta information for accessing the at least one piece of second data, based on whether the virtual file system is permitted to perform the first function of the first application, and
  block providing, to the virtual file system, the meta information for the first data loaded onto a native file system in the memory as per an operation of the first function of the first application, upon determining that the virtual file system is not permitted to perform the first function of the first application based on the first user information.

2. The electronic device of claim 1, wherein the memory is configured to store the at least one application, data related to at least one function of each of the at least one application, the meta information for the first data, the meta information for accessing the at least one piece of second data, and user-related information.

3. The electronic device of claim 1, wherein the at least one processor is further configured to provide, to the virtual file system, the meta information for the first data loaded onto a native file system in the memory as per an operation of the first function of the first application, upon determining that the virtual file system is permitted to perform the first function of the first application based on the first user information.

4. The electronic device of claim 1, wherein the at least one processor is further configured to provide, to the virtual file system, the meta information for the first data loaded onto a native file system in the memory as per an operation of the first function of the first application and the meta information for accessing the at least one piece of second data, which is also loaded onto the native file system in the memory, upon determining that the virtual file system is permitted to perform the first function of the first application based on the first user information.

5. The electronic device of claim 1, wherein the at least one processor is further configured to block providing, to the virtual file system, the meta information for the first data loaded onto a native file system in the memory as per an operation of the first function of the first application while providing the virtual file system with the meta information for accessing the at least one piece of second data, which is also loaded onto the native file system in the memory, upon determining that the virtual file system is not permitted to perform the first function of the first application based on the first user information.

6. The electronic device of claim 1, wherein the meta information for the first data may include at least one of a data name, a data type, a privilege to access, ownership information, a data size, a time varied, a time accessed, a data position, a data attribute information, identification information, or a combination thereof.

7. The electronic device of claim 1, wherein the at least one processor is further configured to:
- determine whether the first user information is owner information among pieces of ownership information included in the meta information for the first data,
- when the first user information is the owner information among the pieces of ownership information included in the meta information for the first data, provide, to the virtual file system, the meta information for the first data loaded onto a native file system in the memory as per an operation of the first function of the first application, and
- when the first user information is not the owner information among the pieces of ownership information included in the meta information for the first data, block providing, to the virtual file system, the meta information for the first data loaded onto the native file system in the memory as per the operation of the first function of the first application.

8. The electronic device of claim 1, wherein the at least one processor is further configured to:
- determine whether the first user information is owner information among pieces of ownership information included in the meta information for the first data,
- when the first user information is not the owner information among the pieces of ownership information included in the meta information for the first data, determine whether the first user information is included in owner group information among the pieces of ownership information included in the meta information for the first data,
- when the first user information is included in the owner group information among the pieces of ownership information included in the meta information for the first data, provide, to the virtual file system, the meta information for the first data loaded onto a native file system in the memory as per an operation of the first function of the first application, and
- when the first user information is not included in the owner group information among the pieces of ownership information included in the meta information for the first data, block providing, to the virtual file system, the meta information for the first data loaded onto the native file system in the memory as per the operation of the first function of the first application.

9. The electronic device of claim 1, wherein the at least one processor is further configured to:
- determine whether the first user information is owner information among pieces of ownership information included in the meta information for the first data,
- when the first user information is not the owner information among the pieces of ownership information included in the meta information for the first data, determine whether the first user information is included in owner group information among the pieces of ownership information included in the meta information for the first data, and
- when the first user information is not included in the owner group information among the pieces of ownership information included in the meta information for the first data, determine whether to provide, to the virtual file system, the meta information for the first data loaded onto a native file system in the memory as per an operation of the first function of the first application based on a security context among pieces of data attribute information included in the meta information for the first data.

10. The electronic device of claim 9,
wherein the security context includes a group permitted to provide the meta information for the first data, and
wherein the at least one processor is further configured to:
- determine whether the first user information is included in information about the permitted group included in security context,
- when the first user information is included in the information about the permitted group, provide, to the virtual file system, the meta information for the first data loaded onto the native file system in the memory as per the operation of the first function of the first application, and
- when the first user information is not included in information about the permitted group, block providing, to the virtual file system, the meta information for the first data loaded onto the native file system in the memory as per the operation of the first function of the first application.

11. The electronic device of claim 9,
wherein security context includes a context condition corresponding to context information related to the electronic device, and
wherein the at least one processor is further configured to:
- determine whether the context information meets the context condition,
- when the context information meets the context condition, block providing, to the virtual file system, the meta information for the first data loaded onto the native file system in the memory as per the operation of the first function of the first application, and
- when the context information does not meet the context condition, provide, to the virtual file system, the meta information for the first data loaded onto the native file system in the memory as per the operation of the first function of the first application.

12. The electronic device of claim 1, wherein the at least one processor is further configured to:
- determine whether the first user information is owner information among pieces of ownership information included in the meta information for the first data,
- when the first user information is not the owner information among the pieces of ownership information included in the meta information for the first data, determine whether the first user information is included in owner group information among the pieces of ownership information included in the meta information for the first data, and
- when the first user information is not included in the owner group information included in the meta information for the first data, determine whether to provide, to the virtual file system, the meta information for the first data loaded onto a native file system in the memory as per an operation of the first function of the first application based on a security context among pieces of data attribute information included in the meta information for the first data.

13. The electronic device of claim 12,
wherein the security context includes a group blocked from providing the meta information for the first data, and
wherein the at least one processor is further configured to:
determine whether the first user information is included in information about the blocked group included in security context,
when the first user information is included in the information about the blocked group, block providing, to the virtual file system, the meta information for the first data loaded onto the native file system in the memory as per the operation of the first function of the first application, and
when the first user information is not included in the information about the blocked group, provide to the virtual file system with the meta information for the first data loaded onto the native file system in the memory as per the operation of the first function of the first application.

14. A method for managing data in an electronic device, the method comprising:
executing a first application among at least one application stored in a memory of the electronic device;
determining whether to provide, to a virtual file system, meta information for first data related to a first function of the first application based on first user information with which the first application is executed among pieces of user information stored in the memory, the meta information for the first data including information for accessing the first data stored in the memory;
determining whether to provide, to the virtual file system, meta information for accessing at least one piece of second data in a folder or a directory including the first data based on the first user information with which the first application is executed, the at least one piece of second data being unrelated to the first function of the first application;
providing, to the virtual file system, the meta information for the first data, upon determining that the virtual file system is permitted to perform the first function of the first application based on the first user information;
providing, to the virtual file system, the meta information for accessing the at least one piece of second data, based on whether the virtual file system is permitted to perform the first function of the first application; and
blocking providing, to the virtual file system, the meta information for the first data loaded onto a native file system in the memory as per an operation of the first function of the first application, upon determining that the virtual file system is not permitted to perform the first function of the first application based on the first user information.

15. The method of claim 14, further comprising providing, to the virtual file system, the meta information for the first data loaded onto a native file system in the memory as per an operation of the first function of the first application, upon determining that the virtual file system is permitted to perform the first function of the first application based on the first user information.

16. The method of claim 14, further comprising providing, to the virtual file system, the meta information for the first data loaded onto a native file system in the memory as per an operation of the first function of the first application and the meta information for accessing the at least one piece of second data, which is also loaded onto the native file system in the memory as per the operation of the first function of the first application, upon determining that the virtual file system is permitted to perform the first function of the first application based on the first user information.

17. The method of claim 14, wherein the determining of whether to permit to provide the meta information for the first data includes:
determining whether the first user information is owner information among pieces of ownership information included in the meta information for the first data,
when the first user information is the owner information among the pieces of ownership information included in the meta information for the first data, providing, to the virtual file system, the meta information for the first data loaded onto a native file system in the memory as per an operation of the first function of the first application, and
when the first user information is not the owner information among the pieces of ownership information included in the meta information for the first data, blocking providing, to the virtual file system, the meta information for the first data loaded onto the native file system in the memory as per the operation of the first function of the first application.

18. At least one non-transitory computer readable recording medium recording a program running on a computer, the program including executable commands executed by at least one processor to enable the at least one processor to:
execute a first application among at least one application stored in a memory of the computer,
determine whether to provide, to a virtual file system, meta information for first data related to a first function of the first application based on first user information with which the first application is executed among pieces of user information stored in the memory, the meta information for the first data including information for accessing the first data stored in the memory,
determine whether to provide, to the virtual file system, meta information for accessing at least one piece of second data in a folder or a directory including the first data based on the first user information with which the first application is executed, the at least one piece of second data being unrelated to the first function of the first application,
provide, to a virtual file system, the meta information for the first data, upon determining that the virtual file system is permitted to perform the first function of the first application based on the first user information,
provide, to the virtual file system, the meta information for accessing the at least one piece of second data, based on whether the virtual file system is permitted to perform the first function of the first application, and
block providing, to the virtual file system, the meta information for the first data loaded onto a native file system in the memory as per an operation of the first function of the first application, upon determining that the virtual file system is not permitted to perform the first function of the first application based on the first user information.

* * * * *